(12) United States Patent
Iizuka

(10) Patent No.: US 6,643,044 B1
(45) Date of Patent: *Nov. 4, 2003

(54) SCANNING OPTICAL SYSTEM

(75) Inventor: Takashi Iizuka, Tokyo (JP)

(73) Assignee: Pentax Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 231 days.

(21) Appl. No.: 08/832,814

(22) Filed: Apr. 4, 1997

(30) Foreign Application Priority Data

Apr. 5, 1996 (JP) .............................. 8-110389

(51) Int. Cl.$^7$ .............................. G02B 26/08
(52) U.S. Cl. ...................... 359/207; 359/208; 359/204; 359/216
(58) Field of Search ................ 359/205–208, 359/216–219

(56) References Cited

U.S. PATENT DOCUMENTS

| 5,233,454 A | | 8/1993 | Sakuma et al. |
| 5,418,639 A | * | 5/1995 | Yamazaki ............... 359/207 |
| 5,541,760 A | | 7/1996 | Iizuka |
| 5,648,865 A | | 7/1997 | Iizuka |
| 5,684,618 A | * | 11/1997 | Atsuumi ............... 359/207 |
| 5,883,732 A | * | 3/1999 | Takada et al. ........... 359/207 |

FOREIGN PATENT DOCUMENTS

| JP | 2-39120 | 2/1990 |
| JP | 5-323222 | 12/1993 |
| JP | 7-181374 | 7/1995 |
| JP | 7-191272 | 7/1995 |
| JP | 8-68957 | 3/1996 |

OTHER PUBLICATIONS

English Language Abstract of JP 2–39120.
English Language Abstract of JP 7–191272.
English Language Abstract of JP 5–323222.
English Translation of Japanese Unexamined Patent Publication No. 9–179018, with English Language Abstract.
English Translation of Japanese Unexamined Patent Publication No. 9–138365, with English Language Abstract.

* cited by examiner

Primary Examiner—James Phan
(74) Attorney, Agent, or Firm—Greenblum & Bernstein, P.L.C.

(57) ABSTRACT

In a scanning optical system, which is provided with an imaging optical system having first and second anamorphic optical elements to converge a deflected light beam from a deflector onto an object surface, a power of the first anamorphic optical element in the auxiliary scanning direction varies according to the position in the main scanning direction such that a magnification of the imaging optical system in the auxiliary scanning direction holds constant in any angle of scanning. With this construction, when the exit light beam from the first anamorphic optical element is divergent in the auxiliary scanning direction, the degree of the divergence can be controlled in accordance with the position in the main scanning direction to keep the diameter constant when the light beam enters into the second anamorphic optical element. Moreover, the differential bow can be reduced in the multi-beam scanning optical system.

16 Claims, 18 Drawing Sheets

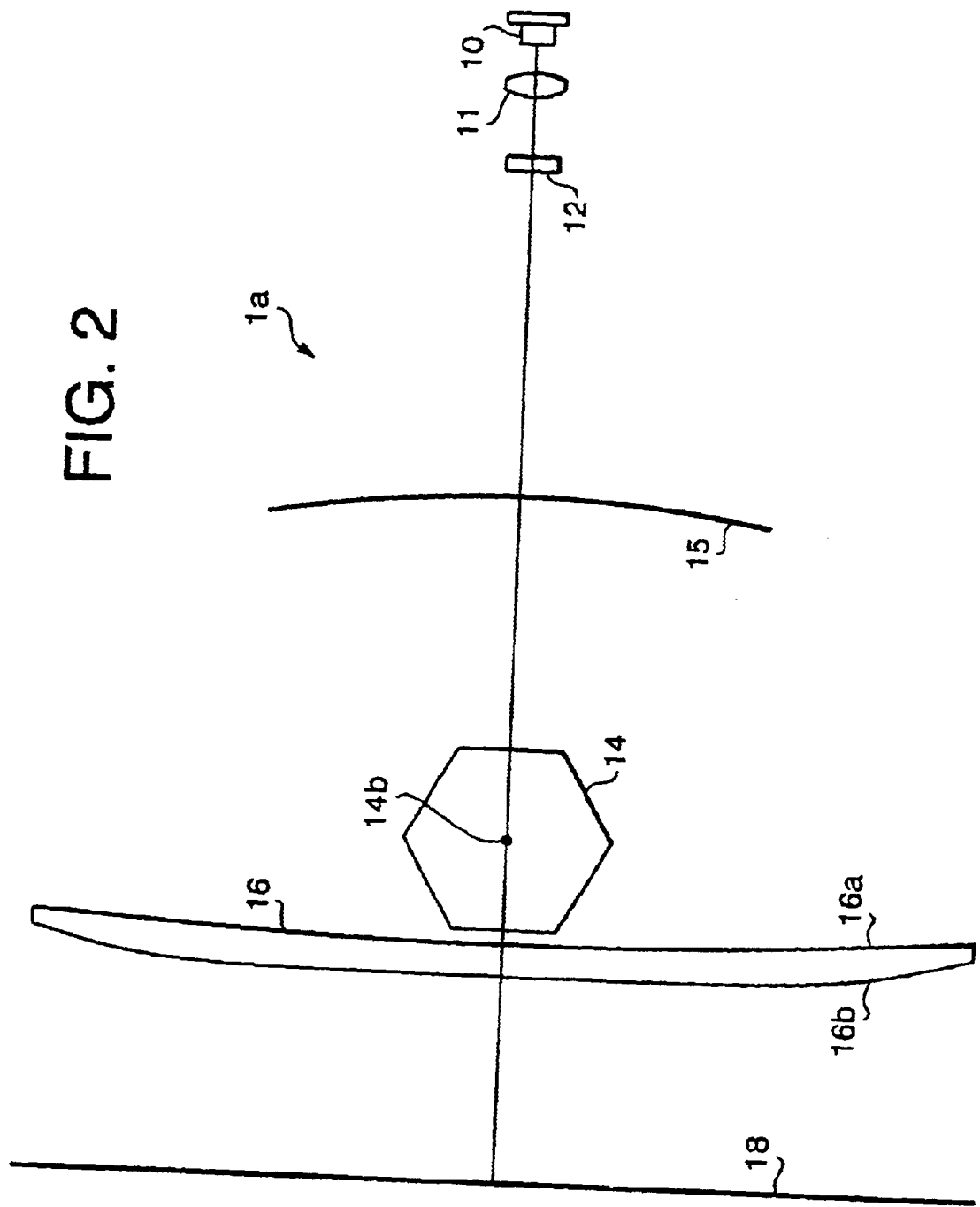

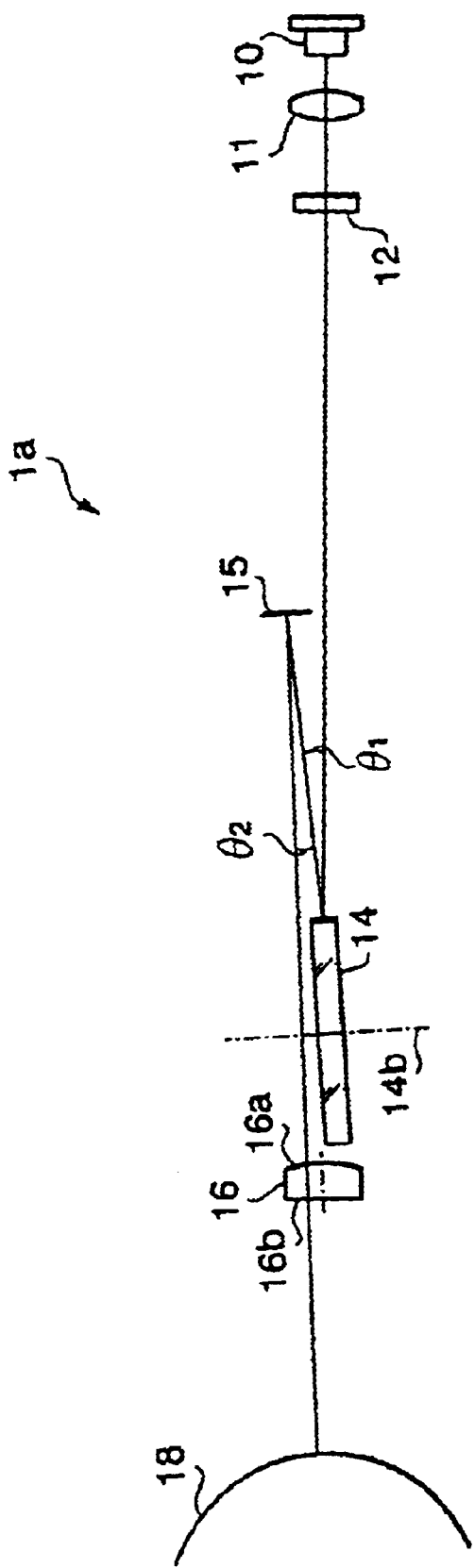

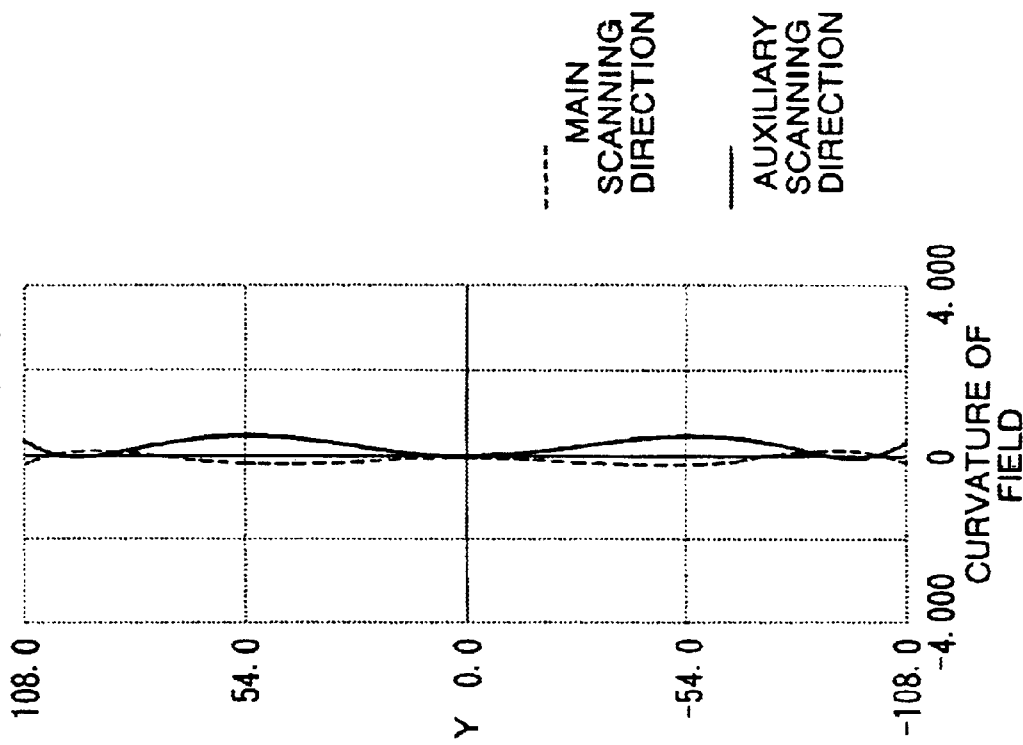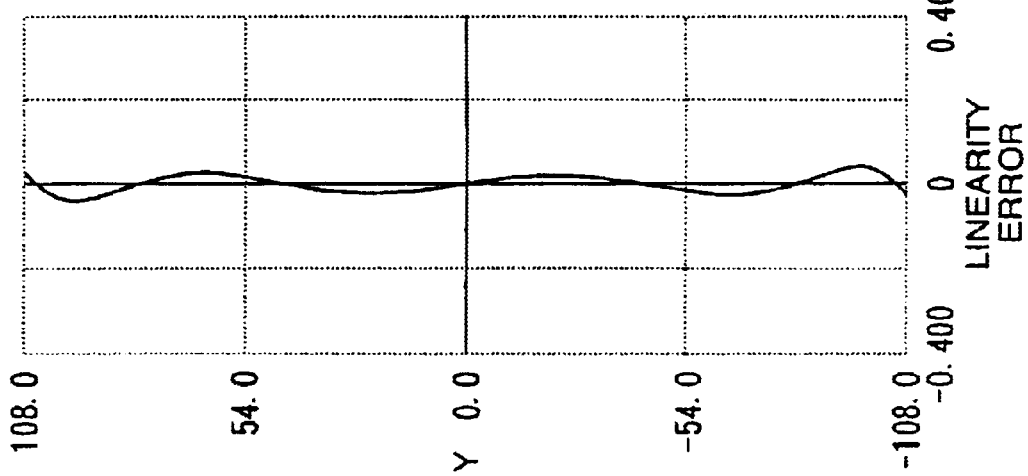

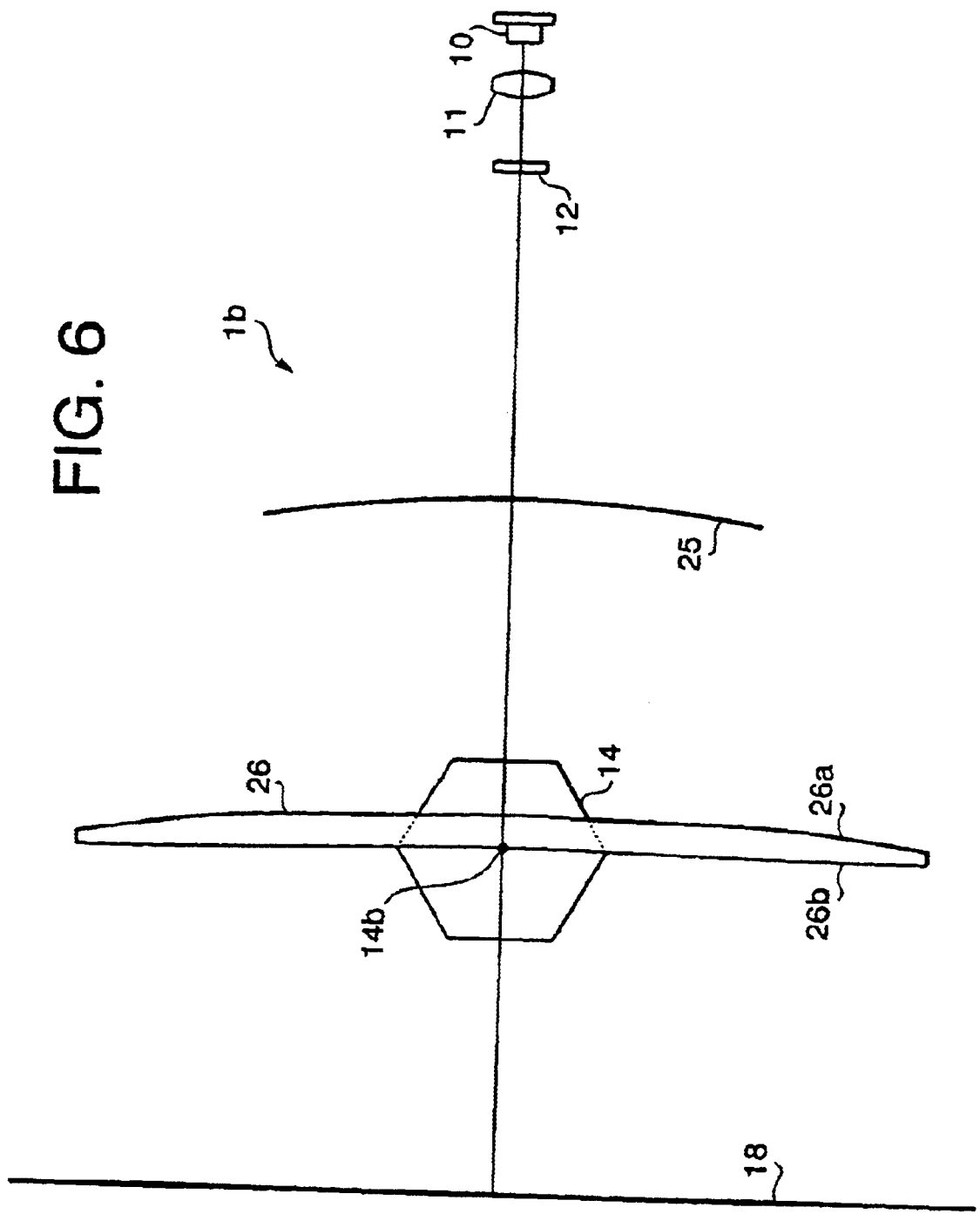

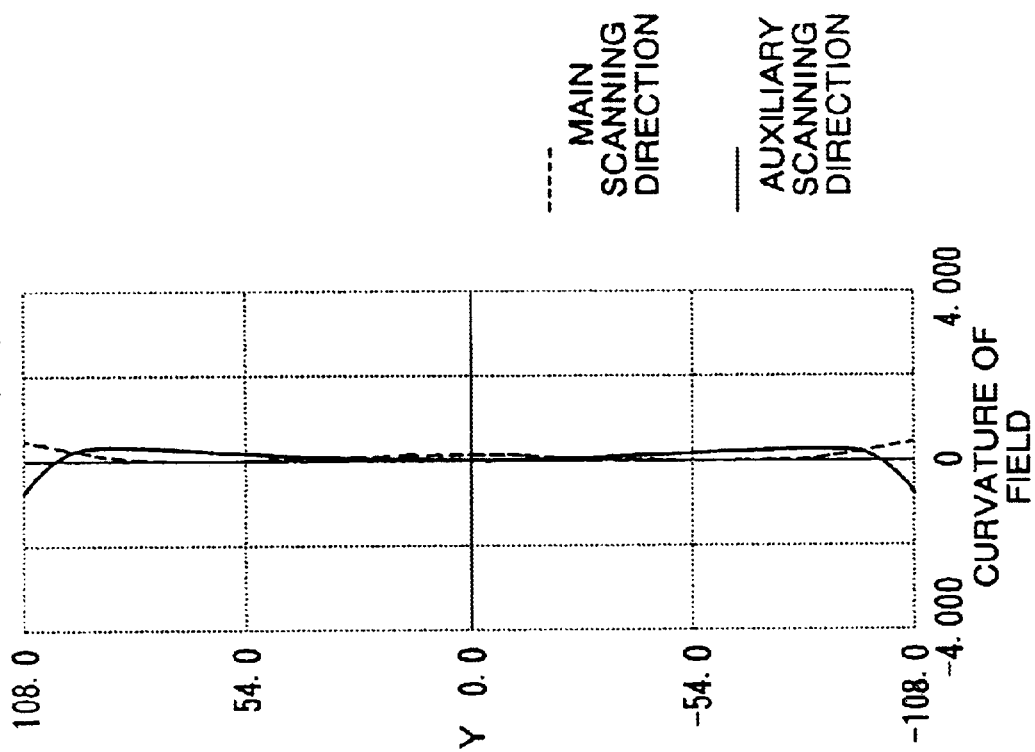
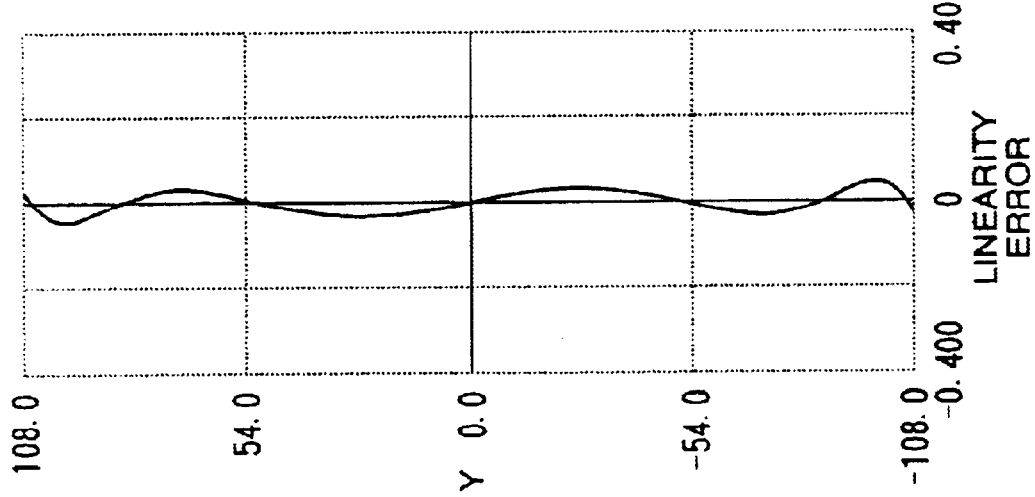

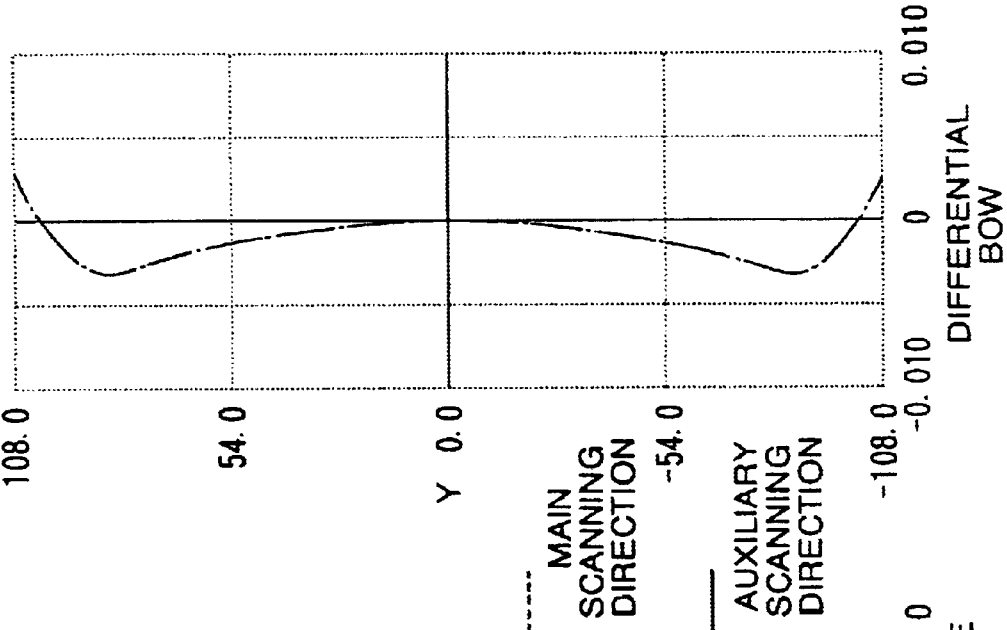
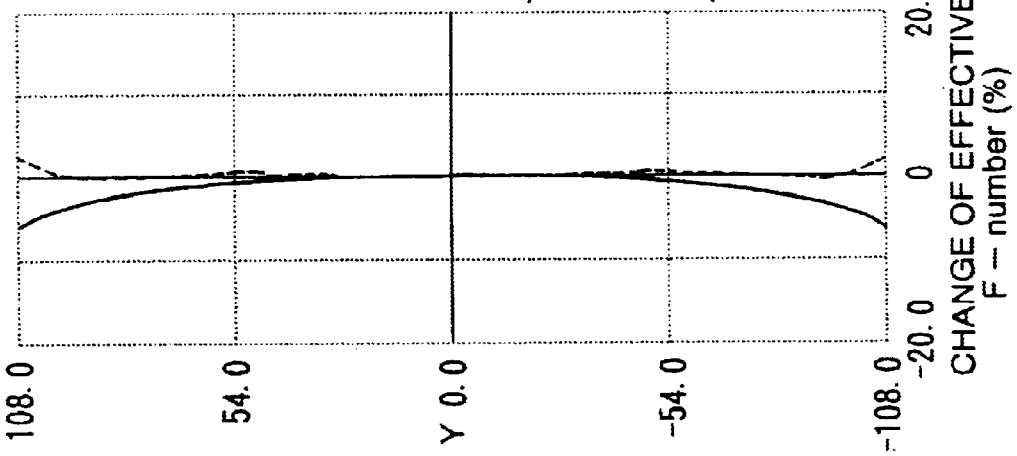
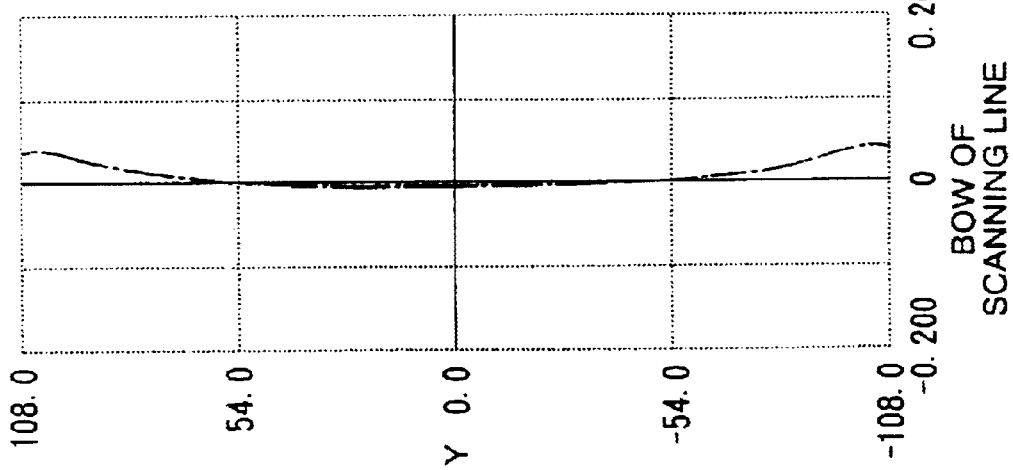

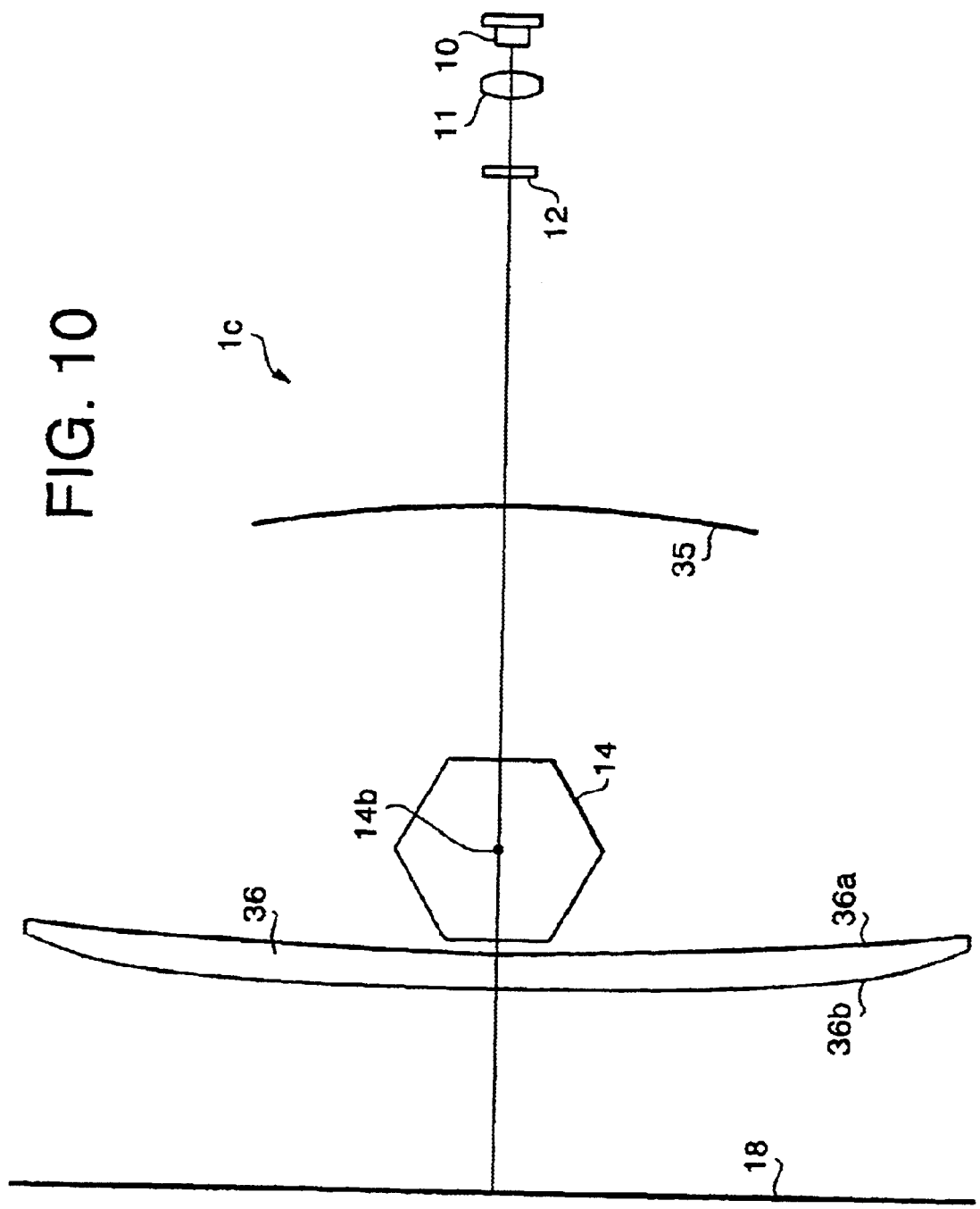

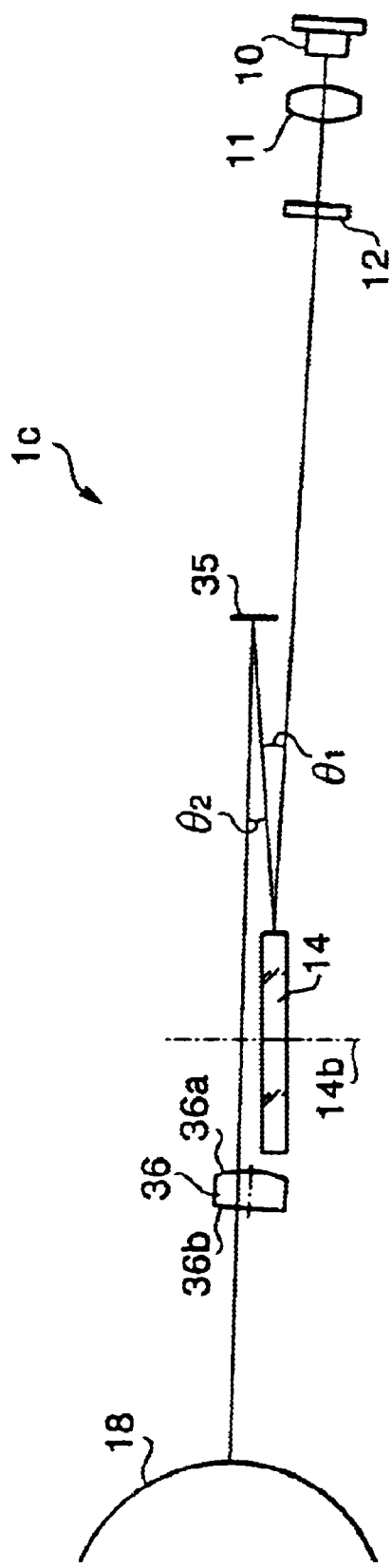

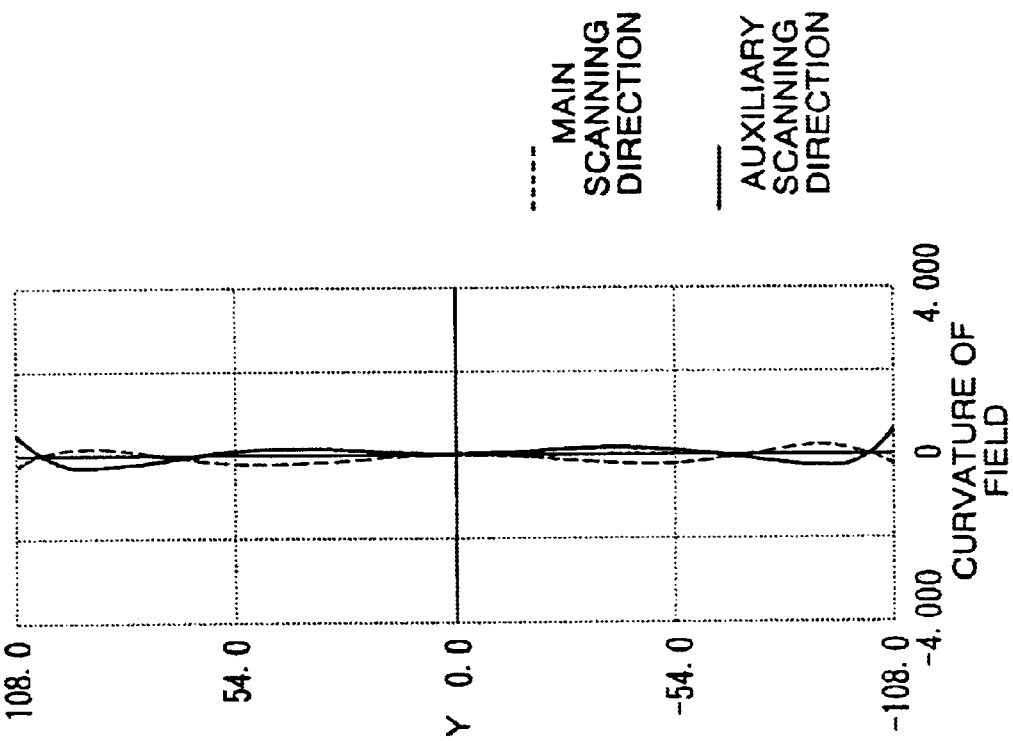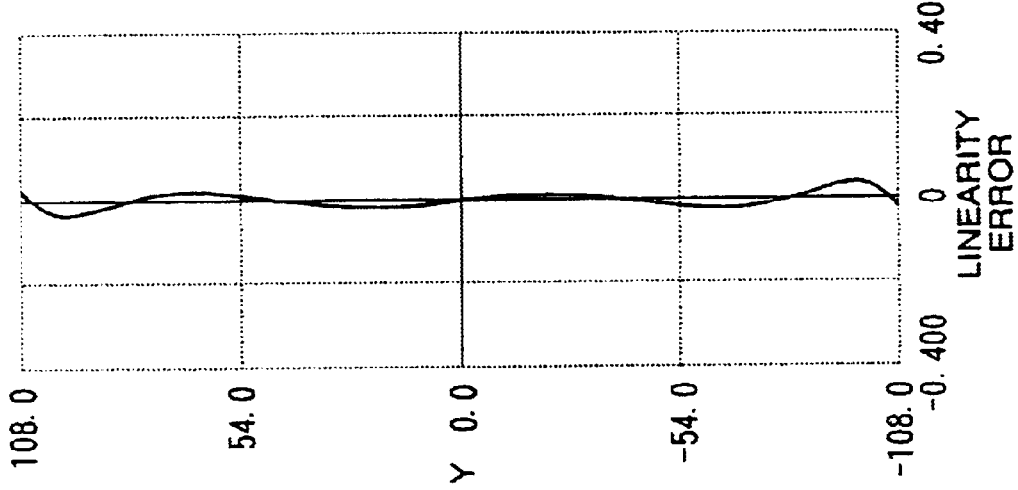

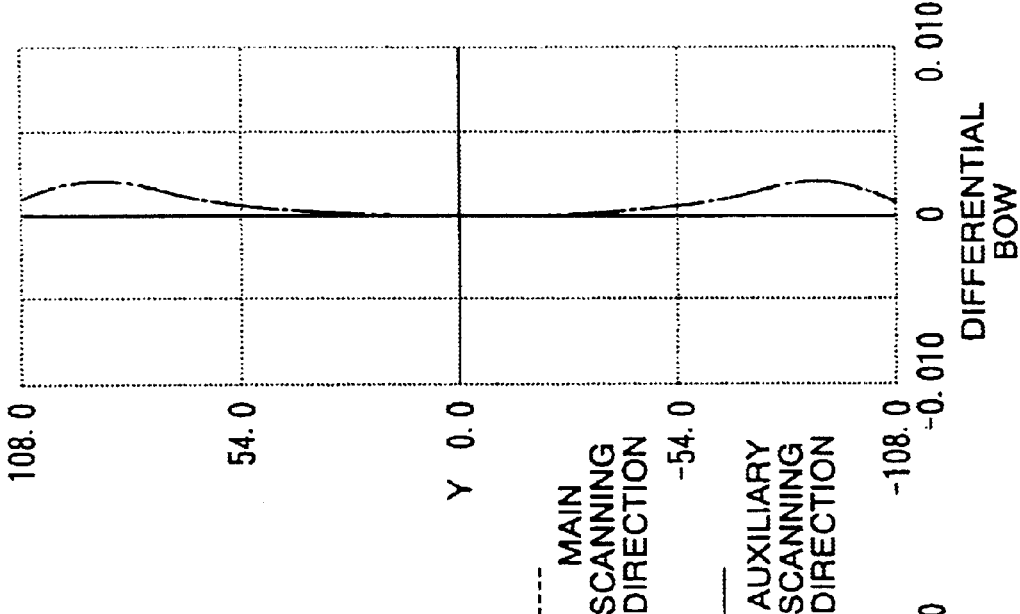
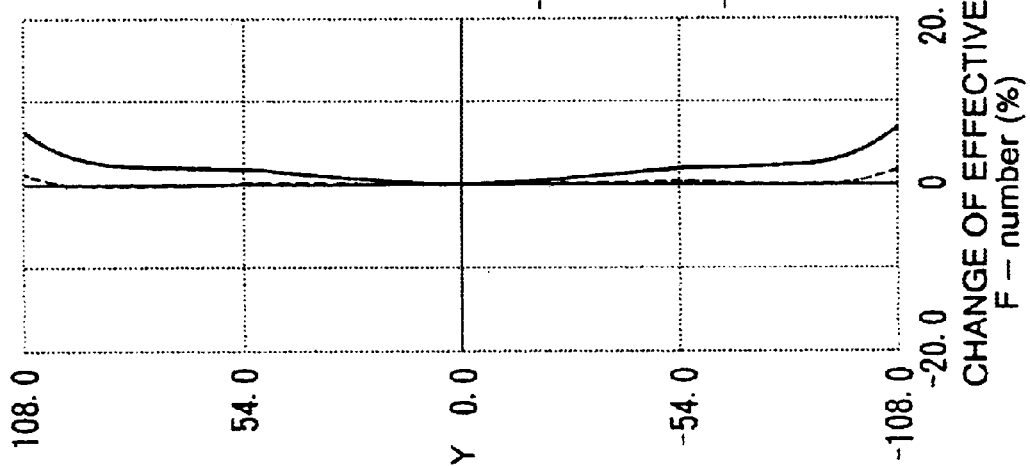
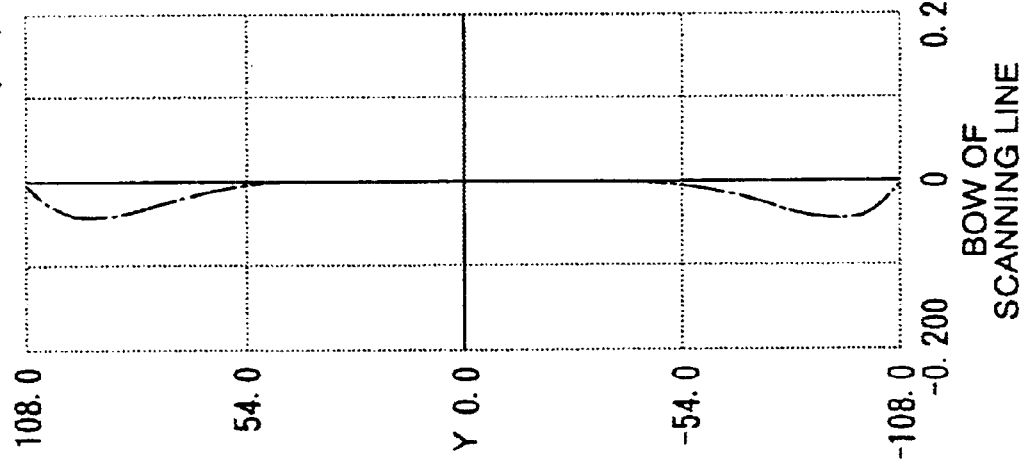

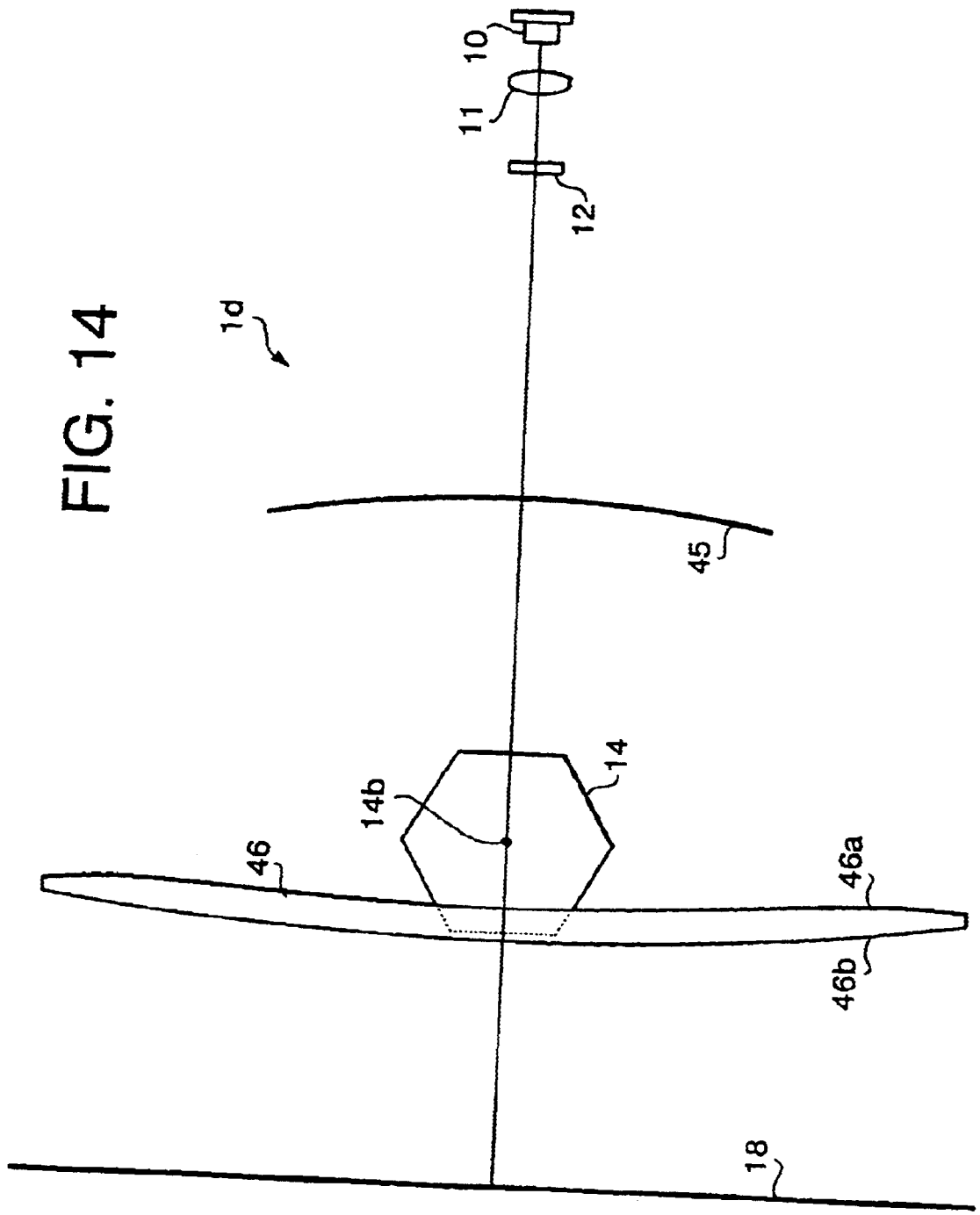

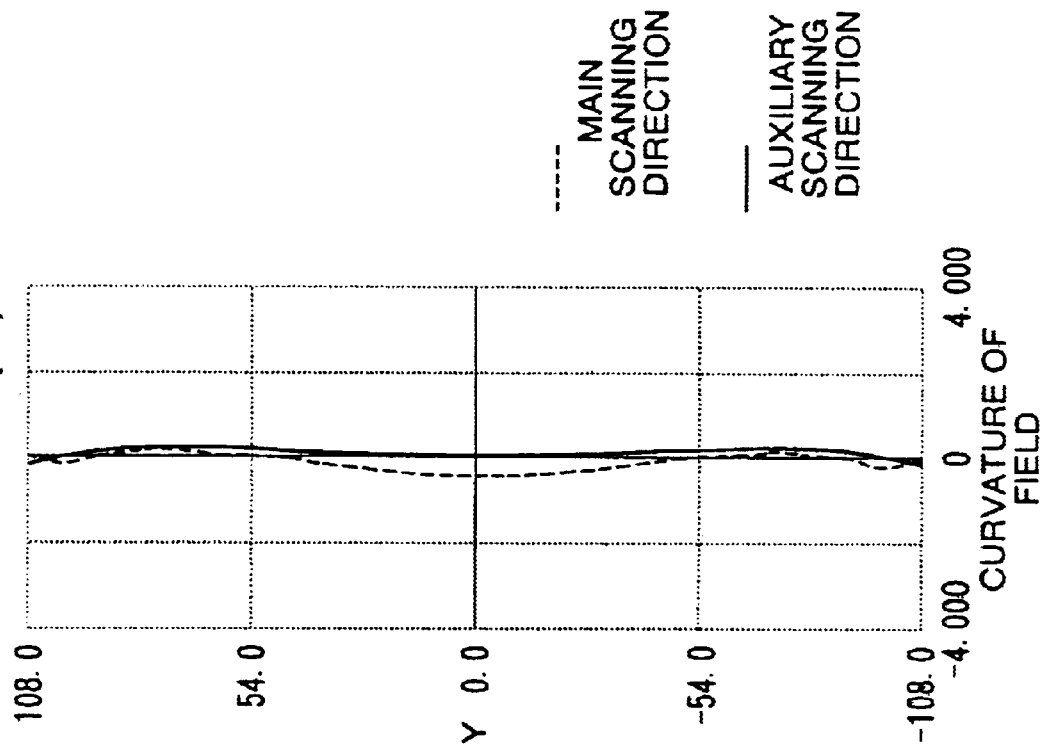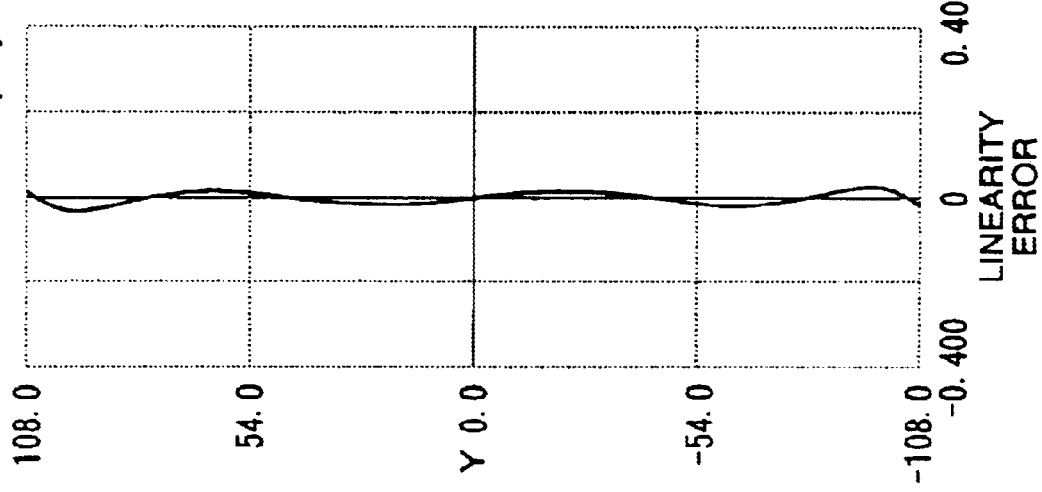

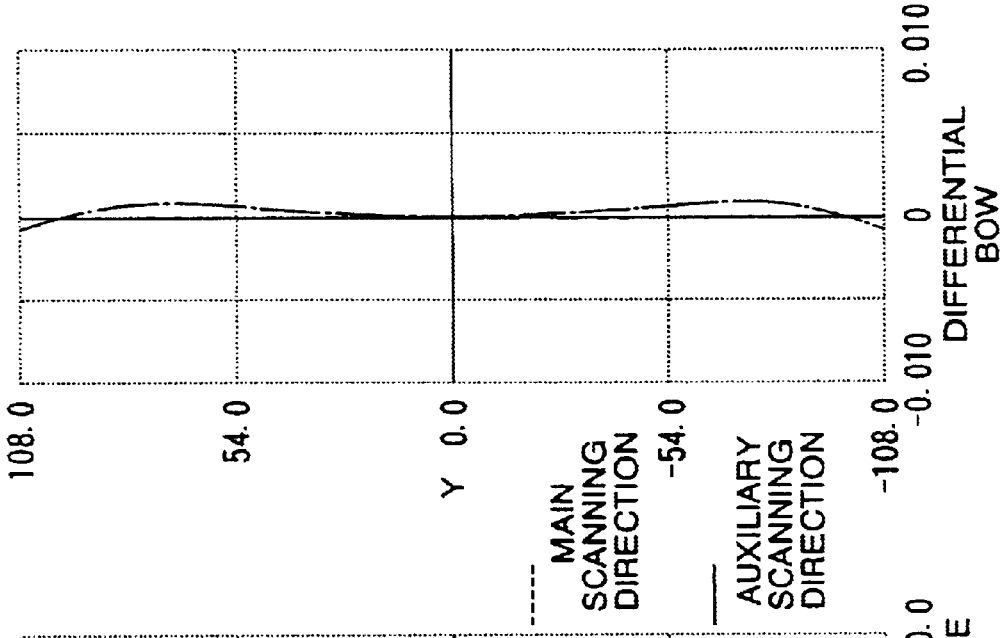
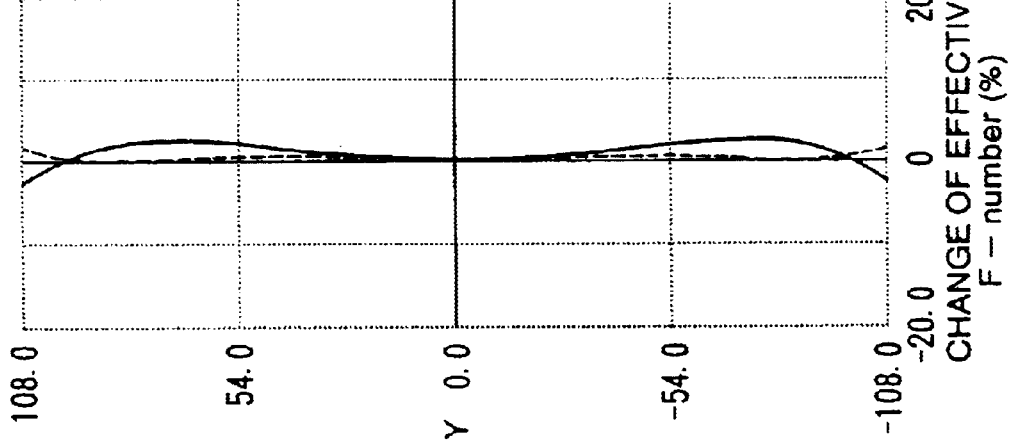
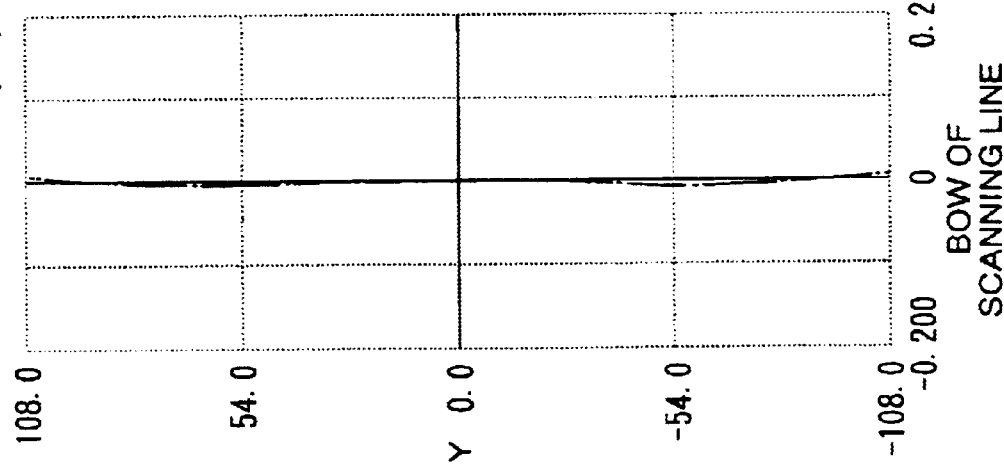

SCANNING OPTICAL SYSTEM

BACKGROUND OF THE INVENTION

The present invention relates to a scanning optical system used for a laser beam printer, a laser facsimile machine, or the like. In particular, the present invention relates to a scanning optical system including first and second anamorphic optical elements to converge a light beam deflected by a deflector onto an object surface.

An example of this type of scanning optical system is disclosed in Japanese Laid Open Patent Publication No. HEI 8-68957. In the disclosed scanning optical system, a laser beam emitted from a semiconductor laser is converged by a cylindrical lens to form a linear image in the vicinity of a polygon mirror. The laser beam is deflected and scanned in a main scanning direction by the polygon mirror and is then converged by an imaging optical system including a curved surface mirror and an anamorphic lens, to form a locus of beam spot on the object surface.

The polygon mirror and the curved surface mirror are arranged such that incident and reflected laser beams are separated in an auxiliary scanning direction.

In the main scanning direction, the laser beam incident to the curved surface mirror is essentially a parallel beam and is converged by means of the positive power of the curved surface mirror onto the object surface. Further, in the auxiliary scanning direction, the laser beam incident to the curved surface mirror is strongly divergent and is converted into a weakly convergent beam by the curved surface mirror and then, is converged by the anamorphic lens onto the object surface.

Since the disclosed scanning optical system is designed for a relatively large optical system in which a distance between the polygon mirror and the curved surface mirror, a distance between the curved surface mirror and the anamorphic lens, and a size of the curved surface mirror itself are relatively large, the optical system cannot be easily made compact.

In particular, if the distance from the polygon mirror to the anamorphic lens via the curved surface mirror decreases in order to reduce the size, differences between the optical path length and incident angle to the anamorphic lens of a light beam directed to the center in the main scanning direction and a light beam directed to the periphery will be enlarged, since the scanning angle range must increase while keeping the scanning width in the main scanning direction constant.

As mentioned above, since the reflected light from the curved surface mirror is divergent light in the auxiliary scanning direction, the variation of the optical path length of the incident light beam to the anamorphic lens in accordance with the change of the deflecting angle changes the diameter of the incident light beam in the auxiliary scanning direction.

The variation of the diameter of the light beam in accordance with the change of the deflecting angle changes an effective F-number of the light beam, and thus the spot diameter on the object surface in the auxiliary scanning direction varies in accordance with the distance from the center of the scanning angle and resolution of the pattern formed on the object surface cannot be kept constant.

Additionally, the change of the effective F-number is considered as a variation of the angular magnification of the optical system from the cylindrical lens to the object surface. That is, although the convergent angle of the light beam exiting from the cylindrical lens is constant, the convergent angle of the light beam exiting from the anamorphic lens varies according to the scanning position of the beam spot, and thus, the angular magnification varies according to the scanning position of the beam spot.

In a multi-beam scanning optical system, which scans a plurality of light beams simultaneously to form a plurality of scanning lines on the object surface as locuses of beam spots per scan, the variation of the angular magnification causes a variation of the distance between the scanning lines in the auxiliary scanning direction in accordance with the scanning position of the beam spots. That is, at least one of the scanning lines is curved like a bow. In this specification, the variation of the distance between the scanning lines is defined as "a differential bow". If the differential bow is too large the performance of the scanning optical system is reduced.

SUMMARY OF THE INVENTION

It is therefore an object of the present invention to provide a scanning optical system that can reduce a variation of the spot diameter in the auxiliary scanning direction according to the scanning position and can reduce differential bow in a multi-beam scanning optical system, even if the distance between a polygon mirror and an anamorphic lens is reduced in order to reduce the size of the scanning optical system.

According to an aspect of a scanning optical system according to the present invention, which is provided with an imaging optical system having first and second anamorphic optical elements to converge a deflected light from a deflector onto an object surface, a power of the first anamorphic optical element in the auxiliary scanning direction varies according to the position in the main scanning direction such that a magnification of the imaging optical system in the auxiliary scanning direction holds constant in any angle of scanning.

With the above construction, when the exit light beam from the first anamorphic optical element is divergent in the auxiliary scanning direction, the degree of the divergence can be controlled in accordance with the position in the main scanning direction to keep the diameter of the light beam in the auxiliary scanning direction constant when the light beam enters into the second anamorphic optical element. Moreover, the differential bow can be reduced in the multi-beam scanning optical system.

In the specific embodiment, the first anamorphic optical element comprises a curved surface mirror and the second anamorphic optical element comprises an anamorphic lens. In the case where the reflected light from the curved surface mirror is divergent in the auxiliary scanning direction, the mirror surface of the curved surface mirror is designed so that a power of the mirror surface in the auxiliary scanning direction varies toward a direction to increase a positive power as the distance from a center in the main scanning direction increases. Such a mirror surface may comprise an advanced toric surface that is defined as a locus formed from the rotation of a non-circular curved line extending in the main scanning direction about an axis parallel to the main scanning direction.

When the curved surface mirror has a negative power in the auxiliary scanning direction, an absolute value of a radius of curvature of the curved surface mirror in the auxiliary scanning direction increases gradually as the distance from a center in the main scanning direction increases. When the curved surface mirror has a positive power in the auxiliary scanning direction, an absolute value of a radius of curvature of the curved surface mirror in the auxiliary scanning direction decreases gradually as the distance from a center in the main scanning direction increases.

At least one surface of the anamorphic lens may be formed as an advanced toric surface that is defined as a locus formed from the rotation of a non-circular curved line extending in the main scanning direction about an axis parallel to the main scanning direction. With this construction, since the positive power in the auxiliary scanning direction can be freely determined, it allows to correct the curvature of field in the auxiliary scanning direction. Moreover, the distribution of the power in the auxiliary scanning direction may give a power in the main scanning direction, and thus the lens surface may have a function to correct the curvature of field in the main scanning direction.

Since the advanced toric surface provided in the curved surface mirror and the anamorphic lens is a surface having a rotation axis, a mold for forming the advanced toric surface can be manufactured by a lathe.

Further, the difference of the power of the anamorphic lens in the auxiliary scanning direction between the center and the peripheries along the main scanning direction is determined to counterbalance curvature of field caused by the power variation of the curved surface mirror in the auxiliary scanning direction. The difference of the power of the anamorphic lens is set larger than in the case where the curved surface mirror is not provided with the Power variation in the auxiliary scanning direction.

When a surface of the anamorphic lens is formed as the advanced toric surface, there are two ways to enlarge the difference of the power in the auxiliary scanning direction. One way is to add the power only at the peripheral portion. Another way is to decrease the radius of curvature in the auxiliary scanning direction as a whole. The former way also changes the surface configuration in the main scanning direction and it affects the curvature of field in the main scanning direction and the linearity error. The latter way is, therefore, better than the former way. When the latter way is taken, since the power in the auxiliary scanning direction increases as a whole, the other side surface of the anamorphic lens should have the negative power that counterbalances the additional positive power of the advanced toric surface. As a result, the anamorphic lens is designed so that a positive power thereof in the auxiliary scanning direction decreases gradually from the center to the peripheries along the main scanning direction. Further, one surface of the anamorphic lens has a negative power in the main scanning direction and a positive power in the auxiliary scanning direction, and the other surface of the anamorphic lens has a negative power in the auxiliary scanning direction.

Still further, the anamorphic lens may be designed such that one lens surface thereof is defined as a locus formed by moving the non-circular curved line in the main scanning direction along a non-circular curved line in the auxiliary scanning direction. This type of surface does not have a rotation axis and thus it is difficult to manufacture a mold for forming a lens. However, since the surface can control powers in the main and auxiliary scanning directions independently, it can correct aberrations in both the scanning directions. When one lens surface of the anamorphic lens is formed as the surface having no rotation axis, the other surface may be formed as a simple rotationally symmetrical surface.

BRIEF DESCRIPTION OF THE DRAWINGS

FIG. 2 shows an arrangement of the scanning optical system according to a first embodiment in the main scanning direction;

FIG. 3 shows the arrangement of the optical system shown in FIG. 2 in the auxiliary scanning direction;

FIGS. 4(A) and 4(B) are graphs showing the linearity error and the curvature of field for the scanning optical system shown In FIG. 2, respectively;

FIG. 6 shows an arrangement of the scanning optical system according to a second embodiment in the main scanning direction;

FIGS. 8(A) and 8(B) are graphs showing the linearity error and the curvature of field for the scanning optical system shown in FIG. 6, respectively;

FIGS. 9(A), 9(B) and 9(C) are graphs showing the bow of the scanning line, the change rate of effective F-number and the differential bow for the scanning optical system shown in FIG. 6, respectively;

FIG. 10 shows an arrangement of the scanning optical system according to a third embodiment in the main scanning direction;

FIG. 11 shows the arrangement of the optical system shown in FIG. 10 in the auxiliary scanning direction;

FIGS. 12(A) and 12(B) are graphs showing the linearity error and the curvature of field for the scanning optical system shown in FIG. 10, respectively;

FIGS. 13(A), 13(B) and 13(C) are graphs showing the bow of the scanning line, the change rate of effective F-number and the differential bow for the scanning optical system shown in FIG. 10, respectively;

FIG. 14 shows an arrangement of the scanning optical system according to a fourth embodiment in the main scanning direction;

FIGS. 16(A) and 16(B) are graphs showing the linearity error and the curvature of for the scanning optical system shown in FIG. 14, respectively;

FIGS. 17(A), 17(B) and 17(C) are graphs showing the bow of the scanning line, the change rate of effective F-number and the differential bow for the scanning optical system shown in FIG. 14, respectively.

DETAILED DESCRIPTION OF THE PREFERRED EMBODIMENTS

Embodiments of a scanning optical system according to the invention will be described below. In the embodiments, a reflection-type scanning optical system is, for example, included in a laser scanning unit used in a laser beam printer to form a scanning laser beam spot that is then modulated by a drawing signal to form a latent image on a surface of a photoconductive drum.

Figure 1:
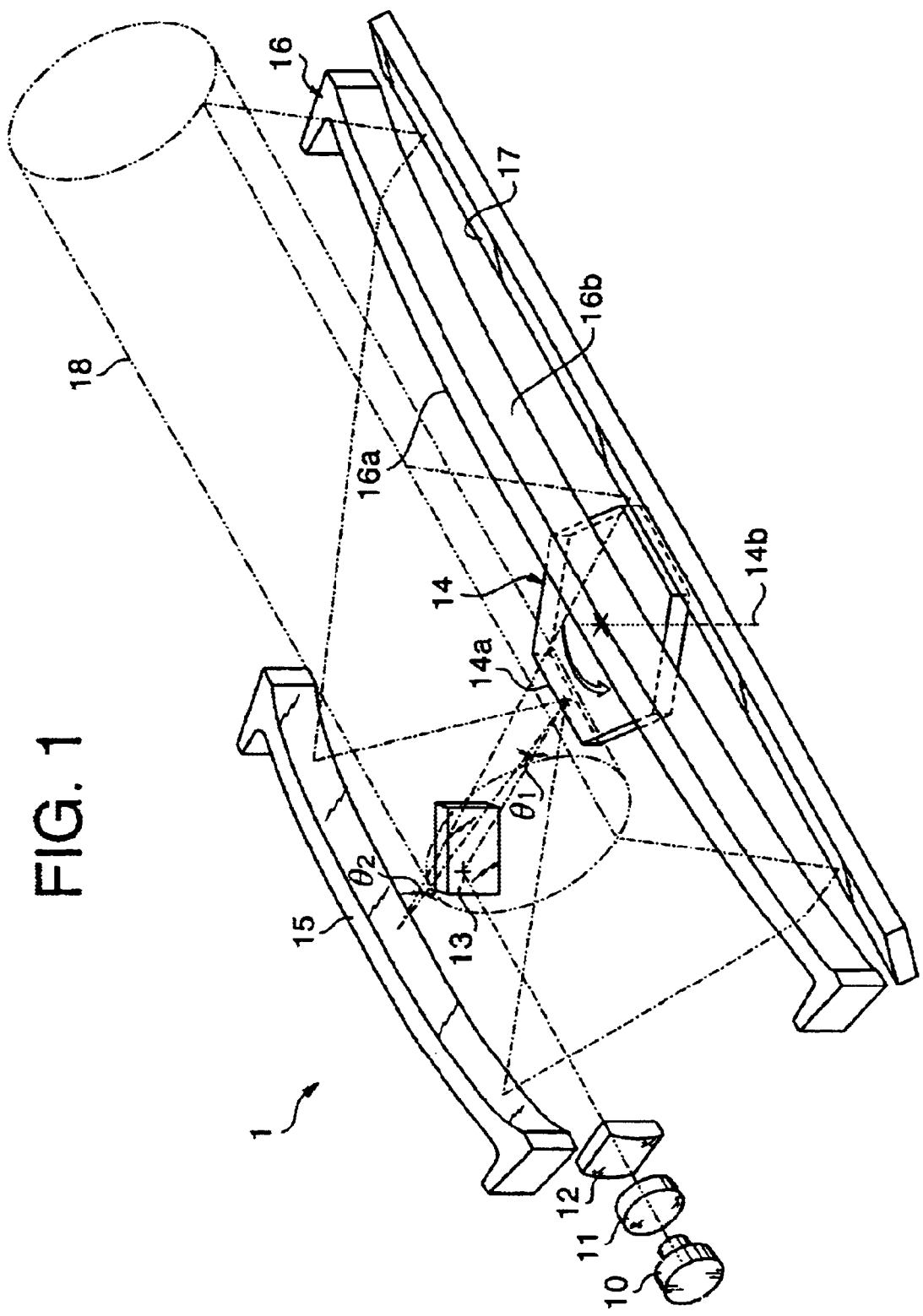
FIG. 1 is a perspective view showing a generic arrangement of a scanning optical system of the present invention.

As shown in FIG. 1, the scanning optical system 1 is arranged such that a diverging light beam generated by a semiconductor laser 10 (light source) is collimated by means of a collimator lens 11. The collimated laser beam then passes through a cylindrical lens 12 and is converged only in an auxiliary scanning direction to form a linear image. The converged beam is then reflected by a flat mirror 13 at substantially a right angle, and is incident to a reflecting surface 14a of a polygon mirror 14. A principal ray of the laser beam incident to the polygon mirror 14 is included in an imaginary plane that also includes a rotation axis 14b of the polygon mirror 14. This plane is defined as "an auxiliary scanning plane".

The polygonal mirror 14 rotates at a high speed, thereby deflecting and scanning the laser beam. The deflected laser beam is then reflected by a curved surface mirror 15 (a first anamorphic optical element) back in the direction of the polygon mirror 14 (but either above or below the polygon mirror 14) and transmits through an anamorphic lens 16 (a second anamorphic optical element). The laser beam transmitted through the anamorphic lens 16 is reflected by a fold-over mirror 17 and forms a beam spot on a surface of a photoconductive drum 18 (i.e., an object surface). As the laser beam scans through a scanning angle, the beam spot scans through a scanning area moving in a main scanning direction parallel to a generatrix of the photoconductive drum 18 as the polygon mirror 14 rotates.

In this specification, "an optical axis of the scanning optical system" is defined as an axis that coincides with the principal ray when the spot formed on the object surface strikes the center of the scanning area. The "main scanning direction" is defined as a direction in a plane perpendicular to the optical axis that corresponds to the scanning direction of the spot on the object surface, and "the auxiliary scanning direction" is defined as a direction perpendicular to the main scanning direction in a plane perpendicular to the optical axis.

The cylindrical lens 12 includes a cylindrical surface having a positive power in the auxiliary scanning direction at the side facing the collimator lens 11, and a flat surface at the side facing the flat mirror 13. The power (focal length) of the cylindrical lens 12 is determined so that the linear image is formed in the vicinity of the reflecting surface 14a of the polygon mirror 14.

The reflected laser beam from the polygon mirror 14 toward the curved surface mirror 15 is substantially parallel in the main scanning direction and is strongly divergent in the auxiliary scanning direction. The mirror surface of the curved surface mirror 15 is designed to have a positive power in both the main and auxiliary scanning directions. Thus, the reflected laser beam from the curved surface mirror 15 is convergent in the main scanning direction and is weakly divergent in the auxiliary scanning direction.

The curved surface mirror 15 is formed as an advanced toric surface. An advanced toric surface is defined as a locus formed from the rotation of a non-circular curved line extending in the main scanning direction about an axis parallel to the main scanning direction. A power of the curved surface mirror 15 in the auxiliary scanning direction varies according to the position along the main scanning direction, such that a magnification of the imaging optical system in the auxiliary scanning direction holds constant at any scanning angle.

In the embodiments, the mirror surface of the curved surface mirror 15 is designed so that the power of the curved surface mirror 15 in the auxiliary scanning direction varies toward a direction to increase a positive power as the distance from a center of the scanning area increases. With this construction, the convergent angle of the laser beam from the anamorphic lens 16 toward the photoconductive drum 18 can be kept constant in the auxiliary scanning direction.

Moreover, the above described scanning optical system can be effectively applied to a multi-beam scanning optical system. The multi-beam scanning optical system, which scans a plurality of light beams simultaneously to form a plurality of scanning lines on the photoconductive drum 18 as locuses of a plurality of beam spots per scan, is provided with a multiple emission laser source (not shown) instead of the semiconductor laser 10. The multiple emission laser source may comprise a plurality of single emission semiconductor lasers or a multiple emission semiconductor laser. Since the magnification in the auxiliary scanning direction of the imaging optical system, which includes the curved surface mirror 15 and the anamorphic lens 16, is constant for any scanning angle, the distance between the scanning lines in the auxiliary scanning direction can be kept constant for any scanning angle, i.e., for any scanning position of the beam spots. That is, differential bow can be reduced.

Further, to obtain the effects described above, it is preferable that the following condition (1) be satisfied for any position along the main scanning direction:

$$0.90 < mz(y)/mz(0) < 1.10 \tag{1},$$

where $mz(y)$ denotes the magnification of the imaging optical system, including the curved surface mirror 15 and the anamorphic lens 16, in the auxiliary scanning direction for a light beam that reaches the photoconductive drum 18 at a position that is a distance y from the center of the scanning area. Thus, $mz(0)$ is a magnification at the center of the scanning area, i.e., on the optical axis of the scanning optical system.

The anamorphic lens 16 has a positive power mainly in the auxiliary scanning direction. The reflected laser beam from the curved surface mirror 15 is converged through the anamorphic lens 16 onto the photoconductive drum 18. The power of the anamorphic lens 16 in the main scanning direction is set for correcting aberrations. In the embodiment, each of the first and second lens surfaces 16a and 16b of the anamorphic lens 16 is formed as an advanced toric surface.

The first lens surface 16a of the anamorphic lens 16 provides a negative power in the main scanning direction and a positive power in the auxiliary scanning direction, the second lens surface 16b provides a negative power in the auxiliary scanning direction. Overall, the-anamorphic lens 16 is designed so that the positive power of the anamorphic lens 16 in the auxiliary scanning direction decreases from the center toward the periphery along the main scanning direction. Further, the difference of the power of the anamorphic lens 16 in the auxiliary scanning direction between the center and the periphery along the main scanning direction is determined to counterbalance any curvature of field caused by the power variation of the curved surface mirror 15 in the auxiliary scanning direction. The difference of the power of the anamorphic lens 16 is set larger than in the case where the curved surface mirror 15 is not provided with the power variation in the auxiliary scanning direction.

The anamorphic lens 16 is arranged such that the optical axis of the anamorphic lens 16 is off-set downward (in the view in FIG. 1) from the optical axis of the scanning optical system.

The scanning laser beam is deflected in the auxiliary scanning direction by the polygon mirror 14 at a first separation angle θ1, and is subsequently again deflected in the auxiliary scanning direction by the curved surface mirror 15 at a second separation angle θ2, and directed to the anamorphic lens 16, in this example, above the polygonal mirror 14.

The first separation angle θ1 is set to be as small as possible, but having sufficient separation to prevent the flat mirror 13 from interfering with the scanning beam. The second separation angle θ2 is also set to be as small as possible, but having sufficient separation from the polygonal mirror 14 to prevent the transmission of oscillations from the rotating polygonal mirror 14 to the anamorphic lens 16.

Since the incident and exit laser beams are separated in the auxiliary scanning direction at the polygon mirror 14 and the curved surface mirror 15, the value of each of the separation angles θ1 and θ2 varies as the scanning angle changes, and these variations cause the bow (curvature) of the scanning line. As the laser beam is incident to the polygonal mirror 14 with an inclination causing the bow of the scanning line, by inclining the curved mirror 15 in a direction opposite to that of the polygonal mirror 14, a canceling curvature is generated, so that the curvatures are substantially canceled out.

Since the anamorphic lens 16 is arranged to be eccentric, or offset, in the auxiliary scanning direction, skew distortion, generated since the laser beam is incident on the reflection surfaces of the polygonal mirror 14 at an angle in the auxiliary scanning direction, is corrected. That is, since the laser beam incident on the anamorphic lens 16 scans with a locus that is offset from the revolution axis of the incident surface 16a of the anamorphic lens 16 (the revolution axis is coincident with the optical axis of the anamorphic lens 16 not with the optical axis of the scanning optical system), the anamorphic lens 16 bends the laser beam asymmetrically about the optical axis of the scanning optical system in the auxiliary scanning direction. With this function, the skew distortion of the laser beam can be corrected.

Further, in the embodiments, the flat mirror 13 reflects the laser beam from the cylindrical lens 12 at a substantially right angle towards the rotary axis 14b of the polygonal mirror 14. The laser beam is directed towards the rotary axis 14b of the polygonal mirror 14 in order to increase the angular range through which scanning is possible. Thus, for example, for a given size of the polygonal mirror 14, the scanning area will be larger than in a conventional arrangement. Conversely, given a required scanning area, the polygonal mirror 14 can be made smaller. Furthermore, with this arrangement, the bow of the scanning line, the curvature of field and the skew distortion occur symmetrically about the optical axis, so that corrections of these aberrations are easily accomplished.

Four embodiments describing concrete numerical constructions, as examples, are described hereinafter.

First Embodiment

FIGS. 2 and 3 show the arrangement of a scanning optical system 1a according to a first embodiment. In FIGS. 2 and 3, the arrangement of the elements is shown in the main scanning direction and in the auxiliary scanning direction, respectively, and the optical paths are expanded such that the first flat mirror 13 and the fold-over mirror 17 are not shown. In the first embodiment, each of the curved surface mirror 15 and the first and second lens surfaces 16a and 16b of the anamorphic lens 16 are formed as an advanced toric surface. As described above, an advanced toric surface is defined as a locus formed from the rotation of a non-circular curved line extending in the main scanning direction about an axis parallel to the main scanning direction. The advanced toric surface is an aspherical surface that is not rotationally asymmetric about an optical axis.

Figures 18A, 18B, 18C:
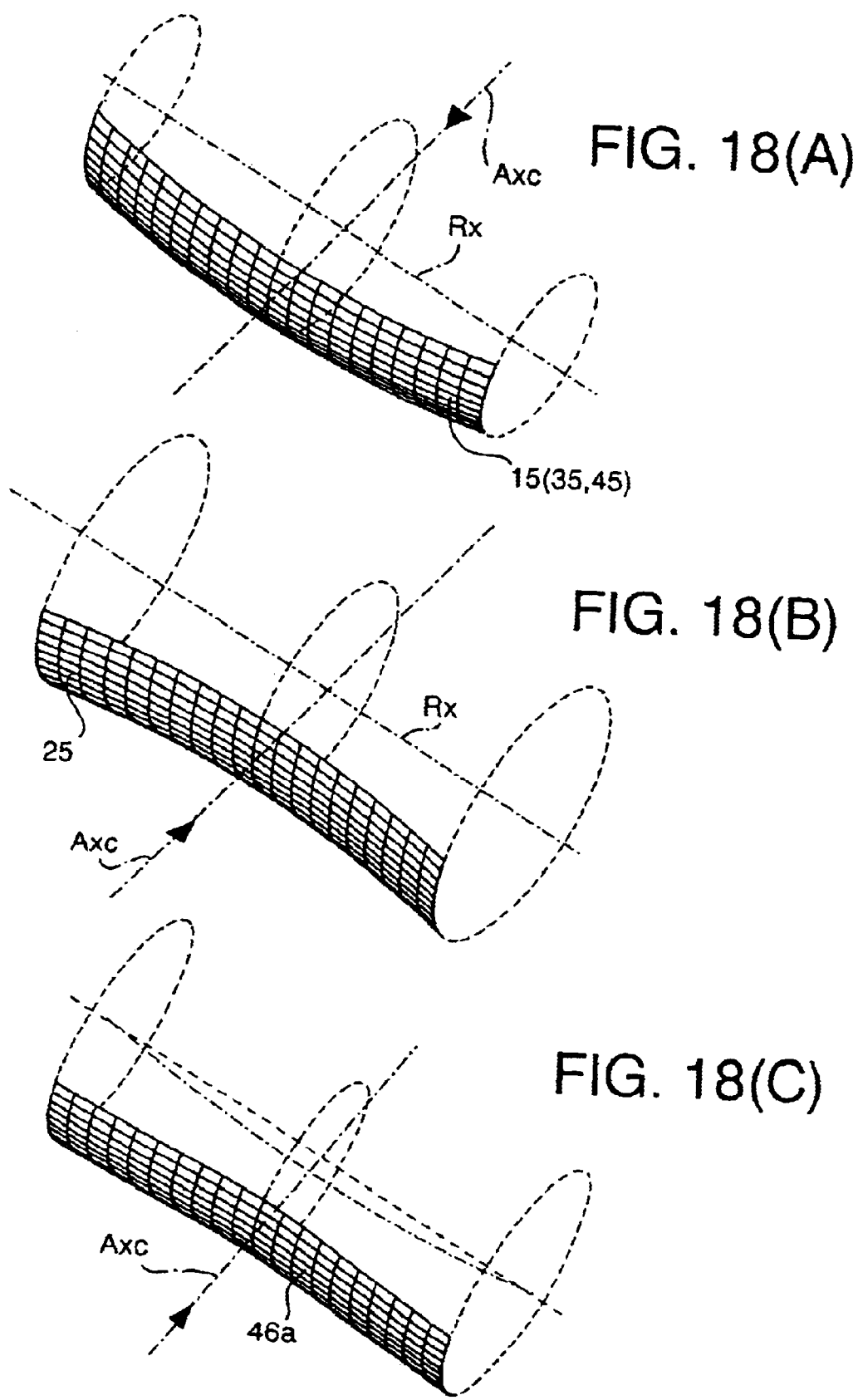
FIGS. 18(A) and 18(B) show configurations of a curved surface mirror and FIG. 18(C) shows a configuration of a first lens surface of an anamorphic lens according to the fourth embodiment.

A configuration of the curved surface mirror 15 is shown in FIG. 18(A). When a bisector, which is included in the auxiliary scanning plane, of the separation angle θ2 formed between principal rays of the incident and exit laser beams at the curved surface mirror 15 is defined as a central axis Axc of the curved surface mirror 15, the curved surface mirror 15 is defined as a locus formed from the rotation of a non-circular curved line extending in the main scanning direction about a rotation axis Rx. The rotation axis Rx intersects the center axis Axc at a right angle and the axis Rx extends along the main scanning direction.

The reflected laser beam from the polygon mirror 14 strikes the curved surface mirror 15 along a direction shown by an arrow on the center axis Axc. The curved surface mirror 15 according to the first embodiment is formed as a concave surface having positive power in both the main and auxiliary scanning directions. The power of the curved surface mirror 15 in the auxiliary scanning direction varies toward a direction to increase a positive power as the distance from the center of the curved surface mirror 15 in the main scanning direction increases. In the first embodiment, the positive power in the auxiliary scanning direction increases gradually as the distance from the center of the curved surface mirror 15 in the main scanning direction increases, i.e., the absolute value of the radius of curvature in a plane parallel to the auxiliary scanning plane decreases gradually.

A positive power of the anamorphic lens 16 in the auxiliary scanning direction decreases gradually from the center to the periphery along the main scanning direction. The first surface 16a of the anamorphic lens 16 has a negative power in the main scanning direction and a positive power in the auxiliary scanning direction. The second surface 16b of the anamorphic lens has a negative power in the auxiliary scanning direction.

An example construction of the first embodiment is described in TABLE 1. In the table, ry denotes a radius of curvature in the main scanning direction, rz denotes a is radius of curvature in the auxiliary scanning direction (blank means a rotationally symmetric surface, i.e., rz=ry), d denotes a distance between the surfaces along the optical axis and n780 denotes the refractive index at 780 nm in wavelength.

Further, surface numbers 1 and 2 represent the cylindrical lens 12, surface number 3 is the polygonal mirror 14, surface number 4 represents the curved surface mirror 15, and surface numbers 5 and 6 represent the first and second surfaces 16a and 16b of the anamorphic lens 16. The first separation angle θ1 is equal to 7.0 degrees on the optical axis and the second separation angle θ2 is equal to 5.0 degrees on the optical axis. The off-center amount of the optical axis of the anamorphic lens 16 from the optical axis of the whole system is equal to −2.69 mm (a minus sign represents off-centered to the side of the light source as shown in FIG. 3).

Each of the curved surface mirror 15 and the lens surfaces 16a and 16b of the anamorphic lens 16 is defined as a locus formed by rotating a non-circular curved line about an axis parallel to the main scanning direction, i.e., an advanced toric surface. The non-circular curved line is defined by the following equation:

$$X = \frac{CY^2}{1 + \sqrt{1-(1+K)C^2Y^2}} + A4Y^4 + A6Y^6 + A8Y^8$$

X is a SAG, that is, a distance between a non-circular curved line and a tangential line at a point a distance Y from the optical axis in the main scanning direction. C is a curvature (1/r) of the top of the line, K is a conic constant and A4, A6 and A8 are aspherical coefficients of fourth, sixth and eighth orders. These constants and coefficients are shown in TABLE 2. The radiuses of curvature of the fourth, fifth, and sixth surfaces in TABLE 1 are the values at the vertexes.

TABLE 1

| Surface number | ry | rz | d | n780 |
|---|---|---|---|---|
| 1 | ∞ | 55.424 | 2.000 | 1.48617 |
| 2 | ∞ | — | 113.000 | |
| 3 | ∞ | — | 50.000 | |
| 4 | −261.191 | −176.137 | 87.458 | |
| 5 | −759.241 | 16.025 | 6.000 | 1.48617 |
| 6 | 2526.391 | 103.495 | 40.642 | |

TABLE 2

| Fourth surface | Fifth surface | Sixth surface |
|---|---|---|
| K = 5.0974 | K = 0 | K = 0 |
| A4 = 1.17052 × 10$^{-7}$ | A4 = 5.36095 × 10$^{-8}$ | A4 = −1.14932 × 10$^{-7}$ |
| A6 = −6.54853 × 10$^{-12}$ | A6 = −2.84293 × 10$^{-12}$ | A6 = 5.76236 × 10$^{-13}$ |
| A8 = 6.86559 × 10$^{16}$ | A8 = −7.85360 × 10$^{-17}$ | A8 = −1.22530 × 10$^{-16}$ |

The curved surface mirror 15 (fourth surface) is defined as a locus formed by rotating the non-circular curved line defined by the above equation about the rotation axis Rx. The rotation axis Rx perpendicularly intersects the center axis Axc at a point offset from the intersecting point between the non-circular curved line and the center axis Axc by 176.137 mm in front of the curved surface mirror 15.

The first lens surface 16a (fifth surface) of the anamorphic lens 16 is defined as a locus formed by rotating the non-circular curved line defined by the above equation about a rotation axis. The rotation axis perpendicularly intersects a center axis of the first lens surface 16a at a point offset from the intersecting point between the non-circular curved line and the center axis by 16.025 mm toward the photoconductive drum 18 side.

Further the second lens surface 16b (sixth surface) of the anamorphic lens 16 is defined as a locus formed by rotating the non-circular curved line defined by the above equation about a rotation axis. The rotation axis perpendicularly intersects a center axis of the second lens surface 16b at a point offset from the intersecting point between the non-circular curved line and the center axis by 103.495 mm toward the photoconductive drum 18 side.

Figures 5A, 5B, 5C:
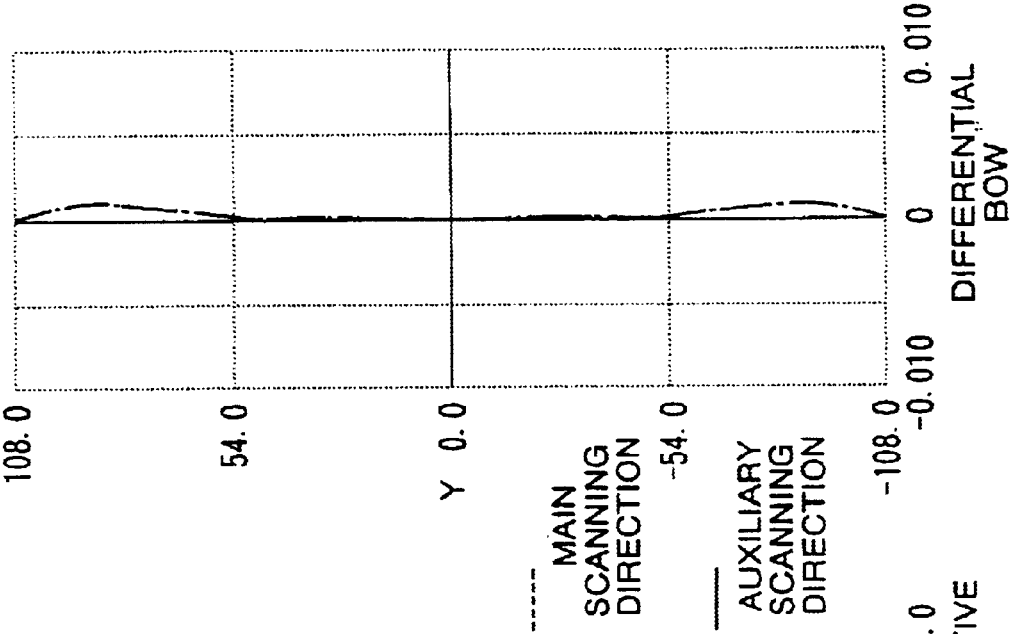
FIGS. 5(A), 5(B) and 5(C) are graphs showing the bow of the scanning line, the change rate of effective F-number, and the differential bow for the scanning optical system shown in FIG. 2, respectively.

FIGS. 4(A) and 4(B) are graphs showing the linearity error and the curvature of field of the scanning line for the scanning optical system 1a according to the first embodiment, respectively. FIGS. 5(A), 5(B) and 5(C) are graphs showing the bow of the scanning line, the change of effective F-number and the differential bow for the scanning optical system 1a according to the first embodiment, respectively. The vertical axis of each graph represents the distance from the center of the main scanning direction on the photoconductive drum 18 in units of millimeters. The horizontal axis represents the amount of aberration. The units for the horizontal axes of FIGS. 4(A), 4(B), 5(A) and 5(C) are millimeters, and that of FIG. 5(B) is percent. The differential bow is represented by the difference of the distance between the scanning lines at each position along the main scanning direction from the distance between the scanning lines at the center of the scanning area. In this case, the scanning lines are separated by 42.3 μm in the auxiliary scanning direction at the center of the scanning area.

According to the first embodiment, the change of the effective F-number falls into a range of ±3% while keeping the linearity error, the curvature of field, and the bow of the scanning line at a low level. Thus, the variation of the spot diameter on the photoconductive drum 18 and the differential bow can be reduced.

Second Embodiment

Figure 7:
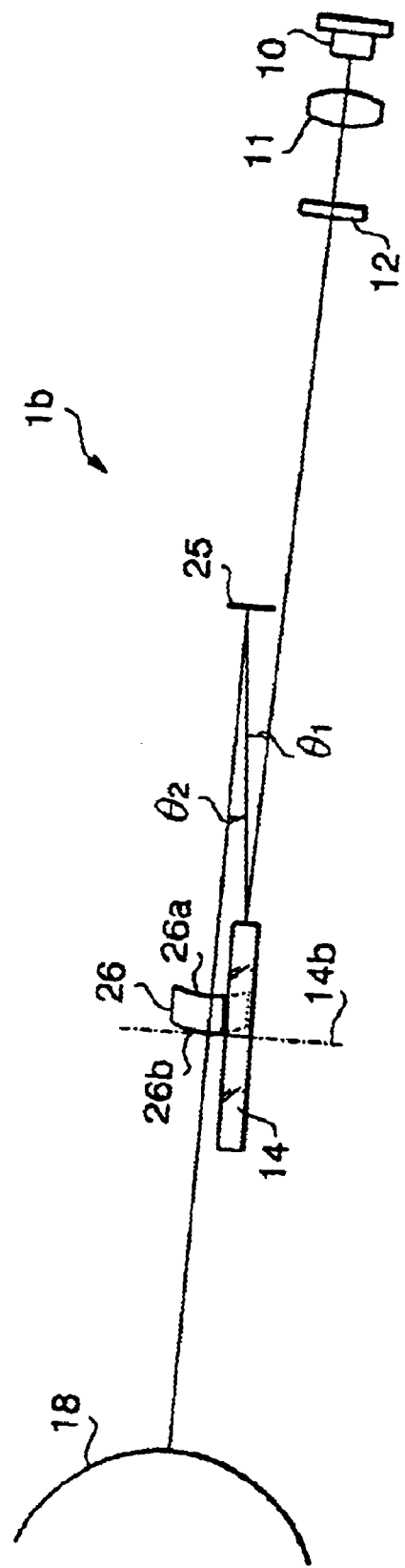
FIG. 7 shows the arrangement of the optical system shown in FIG. 6 in the auxiliary scanning direction.

FIGS. 6 and 7 show the arrangement of a scanning optical system 1b according to a second embodiment. In FIGS. 6 and 7, the arrangement of the elements is shown in the main scanning direction and in the auxiliary scanning direction, respectively. In the second embodiment, a curved surface mirror 25 and an anamorphic lens 26 are designed in a different way from related elements in the first embodiment, and the remaining optical elements, i.e., the cylindrical lens 12, the polygon mirror 14, and the photoconductive drum 18 are identical with those of the first embodiment. As shown in FIG. 7, a portion of the anamorphic lens 26 is cut away in order to decrease the clearance between the anamorphic lens 26 and the polygon mirror 14.

Each of the curved surface mirror 25 and the first and second lens surfaces 26a and 26b of the anamorphic lens 26 is formed as an advanced toric surface. As described above, an advanced toric surface is defined as a locus formed from the rotation of a non-circular curved line extending in the main scanning direction about an axis parallel to the main scanning direction.

A configuration of the curved surface mirror 25 is shown in FIG. 18(B). The curved surface mirror 25 is defined as a locus formed from the rotation of a non-circular curved line extending in the main scanning direction about a rotation axis Rx that intersects the center axis Axc at a right angle.

The reflected laser beam from the polygon mirror 14 strikes the curved surface mirror 25 along a direction shown by an arrow on the center axis Axc. The curved surface mirror 25 according to the second embodiment is formed as a concave surface having positive power in the main scanning direction and as a convex surface having negative power in the auxiliary scanning direction. The power of the curved surface mirror 25 in the auxiliary scanning direction varies toward a direction to increase a positive power as the distance from the center of the curved surface mirror 25 in the main scanning direction increases. In the second embodiment, the negative power in the auxiliary scanning direction decreases gradually as the distance from the center in the main scanning direction increases, i.e., the absolute value of the radius of curvature in a plane parallel to the auxiliary scanning plane increases gradually.

A positive power of the anamorphic lens 26 in the auxiliary scanning direction decreases gradually from the center to the periphery and increases at the edge portions along the main scanning direction. The first surface 26a of the anamorphic lens 26 has a negative power in the auxiliary scanning direction, and the second surface 26b of the anamorphic lens 26 has a negative power in the main scanning direction and a positive power in the auxiliary scanning direction.

An example construction of the second embodiment is described in TABLE 3. The first separation angle θ1 is equal to 7.0 degrees on the optical axis and the second separation angle θ2 is equal to 5.0 degrees on the optical axis. The off-center amount of the optical axis of the anamorphic lens 26 from the optical axis of the whole system is equal to 0.40 mm.

The constants and coefficients that define the non-circular curved line for forming the curved surface mirror 25 and the lens surfaces 26a and 26b of the anamorphic lens 26 are shown in TABLE 4.

TABLE 3

| Surface number | ry | rz | d | n780 |
|---|---|---|---|---|
| 1 | ∞ | 55.424 | 2.000 | 1.48617 |
| 2 | ∞ | — | 113.000 | |
| 3 | ∞ | — | 50.000 | |
| 4 | −261.545 | 133.360 | 61.372 | |
| 5 | −25618.425 | −46.785 | 6.000 | 1.48617 |
| 6 | 963.743 | −14.092 | 67.690 | |

TABLE 4

| Fourth surface | Fifth surface | Sixth surface |
|---|---|---|
| K = 5.0668 | K = 0 | K = 0 |
| A4 = 1.44534 × 10$^{-7}$ | A4 = 1.48633 × 10$^{-7}$ | A4 = −6.49057 × 10$^{-8}$ |
| A6 = −1.24633 × 10$^{-11}$ | A6 = −5.55645 × 10$^{-12}$ | A6 = 6.00017 × 10$^{-12}$ |
| A8 = 8.25347 × 10$^{16}$ | A8 = −2.24539 × 10$^{-16}$ | A8 = −4.44896 × 10$^{-16}$ |

The curved surface mirror 25 (fourth surface) is defined as a locus formed by rotating the non-circular curved line defined by the coefficients of TABLE 4 about the rotation axis Rx. The rotation axis Rx perpendicularly intersects the center axis Axc at a point offset from the intersecting point between the non-circular curved line and the center axis Axc by 133.360 mm behind the curved surface mirror 25.

The first lens surface 26a (fifth surface) of the anamorphic lens 26 is defined as a locus formed by rotating the non-circular curved line defined by the coefficients of TABLE 4 about a rotation axis. The rotation axis perpendicularly intersects a center axis of the anamorphic lens 26 at a point offset from the intersecting point between the non-circular curved line and the center axis by 46.785 mm toward the curved surface mirror 25 side.

Further, the second lens surface 26b (sixth surface) of the anamorphic lens 26 is defined as a locus formed by rotating the non-circular curved line defined by the coefficients of TABLE 4 about a rotation axis. The rotation axis perpendicularly intersects a center axis of the anamorphic lens 26 at a point offset from the intersecting point between the non-circular curved line and the center axis by 14.092 mm toward the curved surface mirror 25 side.

FIGS. 8(A) and 8(B) are graphs showing the linearity error and the curvature of field of the scanning line for the scanning optical system 1b according to the second embodiment, respectively. FIGS. 9(A), 9(B) and 9(C) are graphs showing the bow of the scanning line, the change of effective F-number and the differential bow for the scanning optical system 1b according to the second embodiment, respectively.

According to the second embodiment, the change of the effective F-number falls into a range of is ±5% while keeping the linearity error, the curvature of field, and the bow of the scanning line at a low level. Thus, the variation of the spot diameter on the photoconductive drum 18 and the differential bow can be reduced.

Third Embodiment

FIGS. 10 and 11 show the arrangement of a scanning optical system 1c according to a third embodiment. In FIGS. 10 and 11, the arrangement of the elements is shown in the main scanning direction and in the auxiliary scanning direction, respectively. In the third embodiment, a curved surface mirror 35 and an anamorphic lens 36 are designed in a different way from related elements in the first embodiment, and the remaining optical elements, i.e., the cylindrical lens 12, the polygon mirror 14, and the photoconductive drum 18, are identical with those of the first embodiment.

Each of the curved surface mirror 35 and the first lens surface 36a of the anamorphic lens 36 is formed as an advanced toric surface. In this embodiment, the second lens surface 36b of the anamorphic lens 36 is defined as a locus formed from a parallel movement (i.e., non-rotational movement) of a non-circular curved line extending in the main scanning direction in the auxiliary scanning direction. That is, the second lens surface 36b has power only in the main scanning direction.

The configuration of the curved surface mirror 35 is shown in FIG. 18(A) and is similar to the first embodiment. The power of the curved surface mirror 35 in the auxiliary scanning direction varies toward a direction to increase a positive power as the distance from a center of the curved surface mirror 35 in the main scanning direction increases. In the third embodiment, the positive power in the auxiliary scanning direction increases gradually as the distance from the center in the main scanning direction increases, i.e., the absolute value of the radius of curvature in a plane parallel to the auxiliary scanning plane decreases gradually.

A positive power of the anamorphic lens 36 in the auxiliary scanning direction decreases gradually from the center to the periphery along the main scanning direction. The first surface 36a of the anamorphic lens 36 has a negative power in the main scanning direction and a positive power in the auxiliary scanning direction. The second surface 36b of the anamorphic lens has a negative power in the auxiliary scanning direction.

An example construction of the third embodiment is described in TABLE 5. The first separation angle θ1 is equal to 7.0 degrees on the optical axis and the second separation angle θ2 is equal to 5.0 degrees on the optical axis. The off-center amount of the optical axis of the anamorphic lens 36 from the optical axis of the whole system is equal to −2.34 mm.

The constants and coefficients that define the non-circular curved line for forming the curved surface mirror 35 and the lens surfaces 36a and 36b of the anamorphic lens 36 are shown in TABLE 6.

TABLE 5

| Surface number | ry | rz | d | n780 |
|---|---|---|---|---|
| 1 | ∞ | 55.424 | 2.000 | 1.48617 |
| 2 | ∞ | — | 113.000 | |
| 3 | ∞ | — | 50.000 | |
| 4 | −261.142 | −209.313 | 87.617 | |

TABLE 5-continued

| Surface number | ry | rz | d | n780 |
|---|---|---|---|---|
| 5 | −708.557 | 17.756 | 6.000 | 1.48617 |
| 6 | 2884.976 | ∞ | 40.496 | |

TABLE 6

| Fourth surface | Fifth surface | Sixth surface |
|---|---|---|
| K = 5.2333 | K = 0 | K = 0 |
| A4 = 1.17674 × 10$^{-7}$ | A4 = 4.94634 × 10$^{-8}$ | A4 = −1.25009 × 10$^{-7}$ |
| A6 = −6.34178 × 10$^{-12}$ | A6 = −3.55030 × 10$^{-12}$ | A6 = 7.66402 × 10$^{-13}$ |
| A8 = 7.04719 × 10$^{16}$ | A8 = −8.37140 × 10$^{-17}$ | A8 = −1.94389 × 10$^{-16}$ |

The curved surface mirror 35 (fourth surface) is defined as a locus formed by rotating the non-circular curved line defined by the coefficients of TABLE 6 about the rotation axis Rx. The rotation axis Rx perpendicularly intersects the center axis Axc at a point offset from the intersecting point between the non-circular curved line and the center axis Axc by 209.313 mm in front of the curved surface mirror 35.

The first lens surface 36a (fifth surface) of the anamorphic lens 36 is defined as a locus formed by rotating the non-circular curved line defined by the coefficients of TABLE 6 about a rotation axis. The rotation axis perpendicularly intersects a center axis of the anamorphic lens 36 at a point offset from the intersecting point between the non-circular curved line and the center axis by 17.756 mm toward the photoconductive drum 18 side.

Further, the second lens surface 36b (sixth surface) of the anamorphic lens 36 is defined as a locus formed by moving the non-circular curved line defined by the coefficients of TABLE 6 along the auxiliary scanning direction.

FIGS. 12(A) and 12(B) are graphs showing the linearity error and the curvature of field of the scanning line for the scanning optical system 1c according to the third embodiment, respectively. FIGS. 13(A), 13(B) and 13(C) are graphs showing the bow of the scanning line, the change of effective F-number and the differential bow for the scanning optical system 1c according to the third embodiment, respectively.

According to the third embodiment, the change of the effective F-number falls into a range of 0%–7% while keeping the linearity error, the curvature of field and the bow of the scanning line at a low level. Thus, the variation of the spot diameter on the photoconductive drum 18 and the differential bow can be reduced.

Fourth Embodiment

Figure 15:
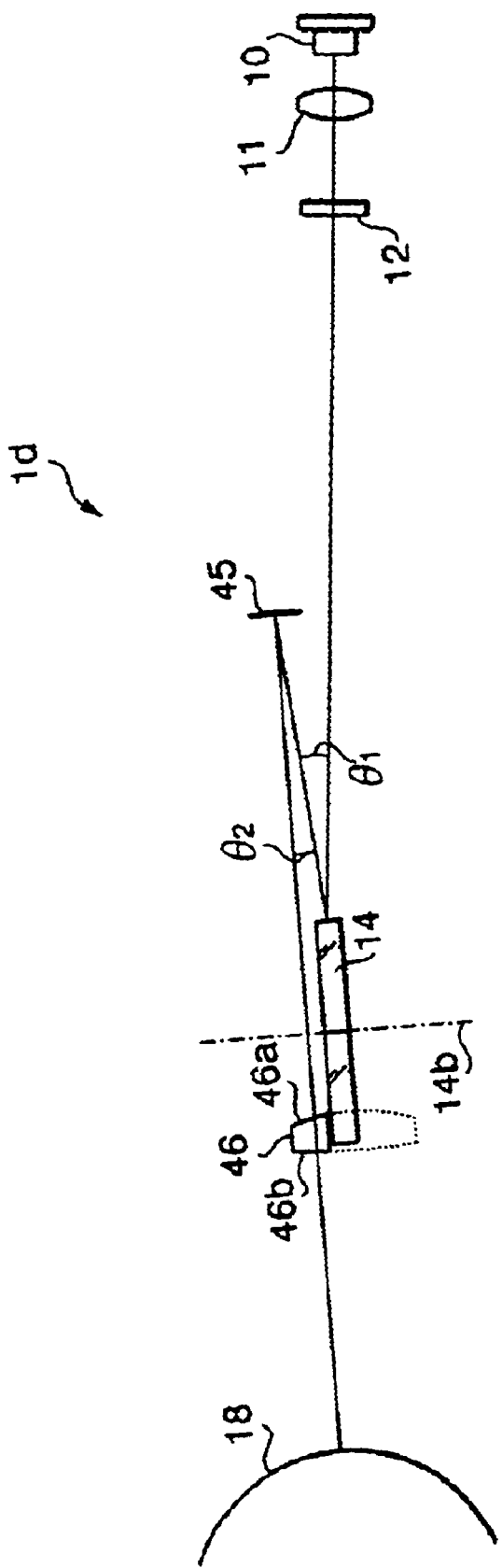
FIG. 15 shows the arrangement of the optical system shown in FIG. 14 in the auxiliary scanning direction.

FIGS. 14 and 15 show the arrangement of a scanning optical system 1d according to a fourth embodiment. In FIGS. 14 and 15, the arrangement of the elements is shown in the main scanning direction and in the auxiliary scanning direction, respectively. In the fourth embodiment, a curved surface mirror 45 and an anamorphic lens 46 are designed in a different way from related elements in the first embodiment, and the remaining optical elements, i.e., the cylindrical lens 12, the polygon mirror 14 and the photoconductive drum 18, are identical with those of the first embodiment.

The curved surface mirror 45 is formed as an advanced toric surface.

The configuration of the curved surface mirror 45 is shown in FIG. 18(A) and is similar to the first embodiment. The power of the curved surface mirror 45 in the auxiliary scanning direction varies toward a direction to increase a positive power as the distance from a center of the curved surface mirror 45 in the main scanning direction increases. In the fourth embodiment, the positive power in the auxiliary scanning direction increases gradually as the distance from the center of the curved surface mirror 45 in the main scanning direction increases, i.e., the absolute value of the radius of curvature in a plane parallel to the auxiliary scanning plane decreases gradually.

As shown in FIG. 18(C), the first lens surface 46a of the anamorphic lens 46 is a curved surface of which a center of curvature in the auxiliary scanning direction varies along the direction of the optical axis in accordance with the position along the main scanning direction. The second lens surface 46b of the anamorphic lens 46 is aspherical, and rotationally symmetric about a center axis Axc2.

An example construction of the fourth embodiment is described in TABLE 7. The first separation angle θ1 is equal to 10.0 degrees on the optical axis and the second separation angle θ2 is equal to 5.0 degrees on the optical axis. The off-center amount of the optical axis of the anamorphic lens 46 from the optical axis of the whole system is equal to −5.86 mm.

The constants and coefficients that define the non-circular curved line for forming the curved surface mirror 45 and the lens surfaces 46a and 46b of the anamorphic lens 46 are shown in TABLE 8 and TABLE 9. The values As2, As4 and As6 are coefficients that are applied to the following equation to define the curvature of the lens surface 46a in the auxiliary scanning direction. The following equation defines the radius of curvature Cz(Y) of the lens surface 46a in a plane parallel to the auxiliary scanning plane at the point where the distance from the optical axis is Y in the main scanning direction where Cz0 is equal to 1/rz:

$$Cz(Y)Cz0+As2 \times Y^2+As4 \times Y^4+As6 \times Y^6.$$

TABLE 7

| Surface number | ry | rz | d | n780 |
|---|---|---|---|---|
| 1 | ∞ | 55.424 | 2.000 | 1.48617 |
| 2 | ∞ | — | 113.000 | |
| 3 | ∞ | — | 50.000 | |
| 4 | −260.006 | −133.562 | 80.065 | |
| 5 | −501.598 | 23.000 | 6.000 | 1.48617 |
| 6 | −2391.219 | — | 47.970 | |

TABLE 8

| Fourth surface | Fifth surface | Sixth surface |
|---|---|---|
| K = 5.4939 | K = 0 | K = 0 |
| A4 = 1.35217 × 10$^{-7}$ | A4 = 6.97010 × 10$^{-8}$ | A4 = −1.17225 × 10$^{-7}$ |
| A6 = −9.14366 × 10$^{-12}$ | A6 = −2.97717 × 10$^{-12}$ | A6 = 5.68397 × 10$^{-12}$ |
| A8 = 8.37809 × 10$^{16}$ | A8 = 6.25610 × 10$^{-17}$ | A8 = 3.08669 × 10$^{-16}$ |

TABLE 9

Fifth surface
$As_2 = -2.08089 \times 10^{-6}$
$As_4 = 9.85955 \times 10^{-11}$
$As_6 = 0$ The curved surface mirror 45 (fourth surface) is defined as a locus formed by rotating the non-circular curved line defined by the coefficients of TABLE 8 about the rotation axis Rx. The rotation axis Rx perpendicularly intersects the center axis Axc at a point offset from the intersecting point between the non-circular curved line and the center axis Axc by 133.562 mm in front of the curved surface mirror 45.

The first lens surface 46a (fifth surface) of the anamorphic lens 46 is defined as a locus formed by moving the non-circular curved line defined by the coefficients of TABLE 8 along the non-circular curved line defined by the coefficients of TABLE 9.

Further, the second lens surface 46b (sixth surface) of the anamorphic lens 46 is defined as a locus formed by rotating the non-circular curved line defined by the coefficients of TABLE 8 about a center axis of the anamorphic lens 46.

FIGS. 16(A) and 16(B) are graphs showing the linearity error and the curvature of field of the scanning line for the scanning optical system 1d according to the fourth embodiment, respectively. FIGS. 17(A), 17(B) and 17(C) are graphs showing the bow of the scanning line, the change of effective F-number and the differential bow for the scanning optical system 1d according to the fourth embodiment, respectively.

According to the third embodiment, the change of the effective F-number falls into the range of ±4% while keeping the linearity error, the curvature of field and the bow of the scanning line at a low level. Thus, the variation of the spot diameter on the photoconductive drum 18 and the differential bow can be reduced.

TABLE 10 shows the magnifications mz(y) of the imaging optical system in the auxiliary scanning direction and the change ratios mz(y) /mz(0) thereof for each of the four embodiments. The function mz(y) denotes the magnification of the optical system in the auxiliary scanning direction for a light beam that reaches the photoconductive drum 18 at a position that is a distance y from the center of the scanning area. That is, mz(0) is magnification on the optical axis, mz(40), mz(80) and mz(108) indicate magnifications at positions for which a distance from the center of the scanning area are equal to 40 mm, 80 mm and 108 mm respectively.

TABLE 10

|  | Embodiment | | | |
| --- | --- | --- | --- | --- |
|  | First | Second | Third | Fourth |
| mz (0) | −0.5134 | −0.3934 | −0.4630 | −0.7328 |
| mz (40) | −0.5234 | −0.3917 | −0.4693 | −0.7441 |
| mz (80) | −0.5260 | −0.3842 | −0.4744 | −0.7518 |
| mz (108) | −0.5245 | −0.3691 | −0.4944 | −0.7113 |
| mz (40)/mz (0) | 1.02 | 1.00 | 1.01 | 1.02 |
| mz (80)/mz (0) | 1.02 | 0.98 | 1.02 | 1.03 |
| mz (108)/mz (0) | 1.02 | 0.94 | 1.07 | 0.97 |

As is shown in TABLE 10, the condition (1) is satisfied in all of the embodiments at the positions of 40 mm, 80 mm and 108 mm.

As mentioned above, since the power of the curved surface mirror 15, 25, 35, 45 in the auxiliary scanning direction is appropriately distributed, the magnification of the optical system including the curved surface mirror 15, 25, 35, 45 and the anamorphic lens 16, 26, 36, 46 in the auxiliary scanning direction can be kept constant at any scanning angle, even if the distance between the polygon mirror and the anamorphic lens is reduced in order to reduce the size of the scanning optical system. Thus, the spot diameter in the auxiliary scanning direction can be held constant and the differential bow can be reduced in a multi-beam scanning optical system.

The present disclosure relates to subject matter contained in Japanese Patent Application No. HEI 08-110389, filed on Apr. 5, 1996, which is expressly incorporated herein by reference in its entirety.

What is claimed is:

1. A scanning optical system comprising:
    a light source that emits a beam;
    a deflector that deflects and scans said beam through a scanning angle; and
    an imaging optical system that forms a spot on an object surface, said imaging optical system comprising:
        a first anamorphic optical element having a positive power in a main scanning direction; and
        a second anamorphic optical element having a positive power mainly in an auxiliary scanning direction;
    wherein a power of said first anamorphic optical element in said auxiliary scanning direction varies along said main scanning direction such that a magnification of said imaging optical system in said auxiliary scanning direction is substantially constant at any scanning angle.

2. The scanning optical system according to claim 1, said power of said first anamorphic optical element in the auxiliary scanning direction varying toward a direction to increase a positive power as the distance from a center of said first anamorphic optical element in the main scanning direction increases.

3. The scanning optical system according to claim 2, said first anamorphic optical element being provided with an advanced toric surface that is defined as a locus formed by the rotation of a non-circular curved line extending in the main scanning direction about an axis parallel to the main scanning direction.

4. The scanning optical system according to claim 3, said first anamorphic optical element comprising a mirror having said advanced toric surface as a reflecting surface.

5. The scanning optical system according to claim 2, said first anamorphic optical element comprising a curved surface mirror having a negative power in the auxiliary scanning direction, an absolute value of a radius of curvature of said curved surface mirror in the auxiliary scanning direction increasing gradually as the distance from a center of said curved surface mirror in the main scanning direction increases.

6. The scanning optical system according to claim 2, said first anamorphic optical element comprising a curved surface mirror having a positive power in the auxiliary scanning direction, an absolute value of a radius of curvature of said curved surface mirror in the auxiliary scanning direction decreasing gradually as the distance from a center of said curved surface mirror in the main scanning direction increases.

7. The scanning optical system according to claim 1, said second anamorphic optical element comprising an anamorphic lens having power in the auxiliary scanning direction that varies along the main scanning direction, at least one surface of said anamorphic lens being formed as an advanced toric surface that is defined as a locus formed from the rotation of a non-circular curved line extending in the main scanning direction about an axis parallel to the main scanning direction.

8. The scanning optical system according to claim 7, wherein a positive power of said anamorphic lens in the auxiliary scanning direction decreases gradually from the center to the periphery along the main scanning direction, a first surface of said anamorphic lens includes a negative power in the main scanning direction and a positive power in the auxiliary scanning direction, and a second surface of said anamorphic lens includes a negative power in the auxiliary scanning direction.

9. The scanning optical system according to claim 7, wherein a positive power of said anamorphic lens in the auxiliary scanning direction decreases gradually from the center to the periphery and increases at the edge portions along the main scanning direction, a first surface of said anamorphic lens includes a negative power in the main scanning direction and a positive power in the auxiliary scanning direction, and a second surface of said anamorphic lens includes a negative power in the auxiliary scanning direction.

10. The scanning optical system according to claim 1, said second anamorphic optical element comprising an anamorphic lens having a positive power in the auxiliary scanning direction that decreases gradually from the center to the periphery along the main scanning direction, at least one surface of said anamorphic lens being formed as a curved surface having a center of curvature in the auxiliary scanning direction that varies along the direction of the optical axis in accordance with a position along the main scanning direction.

11. The scanning optical system according to claim 1, said first anamorphic optical element comprising a curved surface mirror having a positive power in the auxiliary scanning direction, said deflector and said curved surface mirror being arranged such that the incident and exit light beams are separated in the auxiliary scanning direction at said deflector and said curved surface mirror.

12. The scanning optical system according to claim 1, further comprising a cylindrical lens disposed between said light source and said deflector, said cylindrical lens having a positive power in the auxiliary scanning direction to form a linear image that extends along the main scanning direction.

13. The scanning optical system according to claim 12, wherein a power of said cylindrical lens and said first anamorphic optical element are determined such that the light beam incident to said second anamorphic optical element is divergent in the auxiliary scanning direction.

14. The scanning optical system according to claim 1, said light source comprising a multiple emission light source to form a plurality of scanning lines on said object surface as locuses of spots per scan.

15. The scanning optical system according to claim 1, said imaging optical system satisfying the following condition (1) for any scanning angle:

$$0.90 < mz(y)/mz(0) < 1.10 \tag{1}$$

wherein mz(y) is the magnification of said imaging optical system in the auxiliary scanning direction for a light beam that reaches said object surface at a position that is a distance y in the main scanning direction from the optical axis, and mz(0) is the magnification of said imaging optical system in the auxiliary scanning direction for a light beam on the optical axis.

16. The scanning optical system according to claim 1, said beam, deflected by said deflector, first being incident onto said first anamorphic optical element and then being incident onto said second anamorphic optical element.

* * * * *